(12) United States Patent
Emerson

(10) Patent No.: US 10,379,501 B2
(45) Date of Patent: Aug. 13, 2019

(54) MINI-AUTOMATION CONTROLLER

(71) Applicant: The United States of America as represented by the Secretary of the Navy, Crane, IN (US)

(72) Inventor: David R Emerson, Ellettsville, IN (US)

(73) Assignee: The United States of America, as represented by the Secretary of the Navy, Washington, DC (US)

( * ) Notice: Subject to any disclaimer, the term of this patent is extended or adjusted under 35 U.S.C. 154(b) by 201 days.

(21) Appl. No.: 15/484,608

(22) Filed: Apr. 11, 2017

(65) Prior Publication Data

US 2017/0212480 A1 Jul. 27, 2017

Related U.S. Application Data

(62) Division of application No. 14/644,651, filed on Mar. 11, 2015, now Pat. No. 9,874,858.

(Continued)

(51) Int. Cl.
*G05B 15/02* (2006.01)
*H04L 29/08* (2006.01)
(Continued)

(52) U.S. Cl.
CPC ............ *G05B 11/012* (2013.01); *G05B 11/01* (2013.01); *G05B 11/26* (2013.01); *G05B 15/02* (2013.01);
(Continued)

(58) Field of Classification Search
None
See application file for complete search history.

(56) References Cited

U.S. PATENT DOCUMENTS 3,048,705 A * 8/1962 Brown .................... G06F 1/26
307/35
3,701,954 A * 10/1972 Seminatore ............ H03K 3/64
327/114

(Continued)

OTHER PUBLICATIONS

Trout, Mini Home Automation Controller, Jan. 8, 2011, retrieved from: http://www.engadget.com/2011/01/07/homeseer-hometroller-mini-home-automation-controller-gets-you-on/; 3 pages.

(Continued)

*Primary Examiner* — Ramesh B Patel
(74) *Attorney, Agent, or Firm* — Christopher A. Monsey

(57) ABSTRACT

Systems and methods for controlling lab equipment such as transmitters are provided that includes a mini automation controller (MAC). The system provides a control system, user interface, and interfaces, including network interfaces usable for interfacing equipment, MAC, and user interfaces over a network, which provide a variety of functions including automation and monitoring of transmission sequences and receiver events. An exemplary MAC may include an Ethernet controller capable of converting an Ethernet signal to a serial signal. The MAC may also include a receiver monitor section comprising a fiber optic receiver input, a copper cable receiver input, and a monostable multivibrator. In addition to the receiver monitor section, the MAC may have a transmitter control section including a transmitter control pulse and a power output. An exemplary MAC may have a microcontroller coupled to the Ethernet controller, the receiver monitor section, and the transmitter control section.

16 Claims, 9 Drawing Sheets

Related U.S. Application Data

(60) Provisional application No. 61/954,800, filed on Mar. 18, 2014.

(51) Int. Cl.
*G05B 11/01* (2006.01)
*H04L 29/06* (2006.01)
*G05B 11/26* (2006.01)
*G05B 19/418* (2006.01)

(52) U.S. Cl.
CPC .......... *G05B 19/4185* (2013.01); *H04L 69/08* (2013.01); *G05B 2219/1214* (2013.01); *G05B 2219/31233* (2013.01)

(56) References Cited

U.S. PATENT DOCUMENTS

| | | | |
|---|---|---|---|
| 3,812,462 A | 5/1974 | Crossland et al. | |
| 4,034,212 A | 7/1977 | Paxton | |
| 4,218,757 A | 8/1980 | Drogichen | |
| 4,256,926 A * | 3/1981 | Pitroda | H04Q 11/0407 370/360 |
| 4,589,063 A | 5/1986 | Shah et al. | |
| 4,686,622 A * | 8/1987 | Hyatt | B60R 16/0373 345/156 |
| 5,619,505 A * | 4/1997 | Grube | H04L 27/2608 370/476 |
| 5,640,596 A * | 6/1997 | Takamoto | G06F 13/126 710/21 |
| 5,832,303 A * | 11/1998 | Murase | H04L 49/101 710/36 |
| 6,219,032 B1 | 4/2001 | Rosenberg et al. | |
| 6,278,357 B1 * | 8/2001 | Croushore | H04B 3/54 340/534 |
| 6,675,070 B2 * | 1/2004 | Lapham | B25J 9/1656 318/568.11 |
| 6,938,111 B2 * | 8/2005 | Herberth | G05B 19/042 710/104 |
| 6,961,306 B2 * | 11/2005 | Ying | H04L 12/422 370/222 |
| 7,792,046 B2 * | 9/2010 | Kucharczyk | H04L 12/4645 370/244 |
| 7,853,706 B2 | 12/2010 | Janssen et al. | |
| 9,874,858 B2 * | 1/2018 | Emerson | H04L 69/08 |
| 2005/0115561 A1 * | 6/2005 | Stahmann | A61B 5/0031 128/200.24 |
| 2009/0300216 A1 * | 12/2009 | Garcia | G06Q 10/00 709/245 |
| 2013/0038389 A1 * | 2/2013 | Sorrells | H03F 1/0205 330/185 |
| 2013/0231882 A1 * | 9/2013 | Yu | G01R 13/0236 702/67 |
| 2013/0322511 A1 * | 12/2013 | Varma | H04L 27/0014 375/230 |

OTHER PUBLICATIONS

Maiti et al., IR Remote Control Signal Decoder for Home Automation, May 3, 2014, retrieved from: http://www.ijesit.com/Volume%203/Issue%203/IJESIIT201403_33.pdf; 7 pages.

* cited by examiner

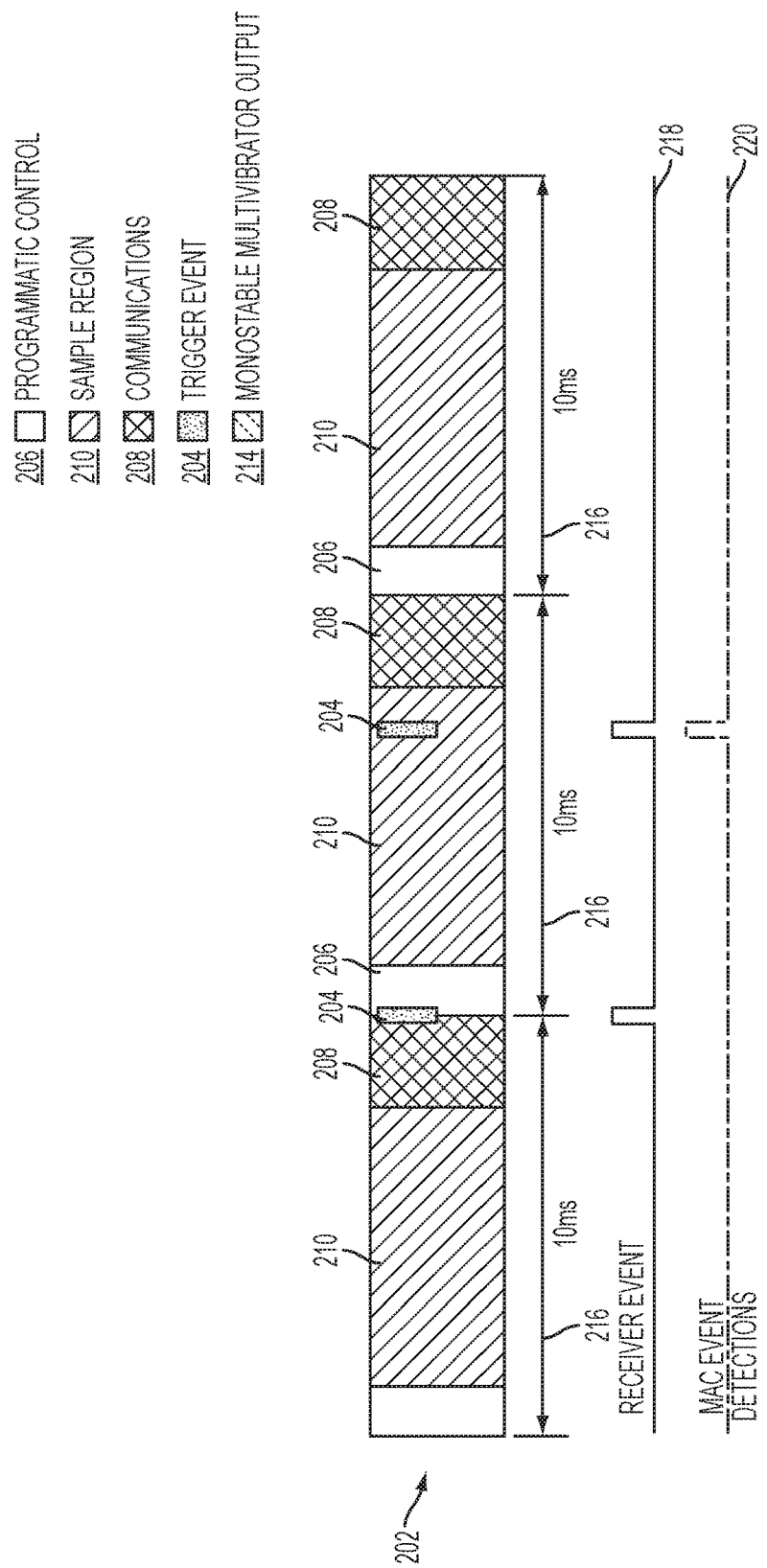

| COMMAND DESCRIPTION | COMMAND | EXPECTED RESPONSE | |
|---|---|---|---|
| CHECK FOR CONNECTION TO MAC | 100/r | OUTPUT:<br>OK\r\n | 902 |
| GET CURRENT TRANSMIT INTERVAL IN MULTIPLES OF 10ms | 101/r | OUTPUT:<br>CURRENT Tx INTERVAL (x10ms): N\r\n<br>WHERE $10 \leq N \leq 65535$ | 904 |
| SET NEW TRANSMIT INTERVAL IN MULTIPLES OF 10ms | 102/r | OUTPUT:<br>INPUT Tx INTERVAL (x10ms):\r\n<br>INPUT:<br>N\r\n<br>WHERE $10 \leq N \leq 65535$ | 906 |
| GET FIRMWARE REVISION NUMBER | 103/r | OUTPUT:<br>VERSION: X.X.X.1822\r\n | 908 |
| GET MAC SERIAL NUMBER | 104/r | OUTPUT:<br>S/N: MAC-XXXX\r\n<br>WHERE $0 \leq X \leq 255$ | 910 |
| GET CURRENT Tx LENGTH IN MULTIPLES OF 10ms | 105/r | OUTPUT:<br>CURRENT Tx LENGTH (x10ms): N\r\n<br>WHERE $2 \leq N \leq 65535$ | 912 |
| SET NEW TRANSMIT LENGTH IN MULTIPLES OF 10ms | 106/r | OUTPUT:<br>INPUT Tx LENGTH (x10ms): \r\n<br>INPUT:<br>N\r\n<br>WHERE $2 \leq N \leq 65535$ | 914 |
| BEGIN TRANSMIT AND RECEIVE SEQUENCE | 1/r | OUTPUT:<br>N\r\n<br>WHERE N = 0, 1, 2, OR 3<br>0 = NO TRANSMIT OR RECEIVE DETECTED<br>1 = TRANSMIT ONLY DETECTED<br>2 = RECEIVE ONLY DETECTED<br>3 = BOTH TRANSMIT AND RECEIVE DETECTED<br><br>THIS SEQUENCE IS REPEATED X TIMES, WHERE X IS EQUAL TO THE Tx LENGTH | 916 |
| NOTE:<br>\r - INDICATES THAT A CARRIAGE RETURN IS SENT<br>\n - INDICATES THAT A LINE FEED IS SENT | | | |

FIG. 9

MINI-AUTOMATION CONTROLLER

CROSS-REFERENCE TO RELATED APPLICATION

This application is a divisional of and claims priority to U.S. Pat. No. 9,874,858, filed on Mar. 11, 2015 and titled "Mini-Automation Controller"; and priority to U.S. Provisional Application Ser. No. 61/954,800, filed on Mar. 18, 2014 and titled "Mini Automation Controller", the disclosures of which are expressly incorporated herein by reference.

STATEMENT REGARDING FEDERALLY SPONSORED RESEARCH OR DEVELOPMENT

The invention described herein was made in the performance of official duties by employees of the Department of the Navy and may be manufactured, used and licensed by or for the United States Government for any governmental purpose without payment of any royalties thereon. This invention (Navy Case 200,420) is assigned to the United States Government and is available for licensing for commercial purposes. Licensing and technical inquiries may be directed to the Technology Transfer Office, Naval Surface Warfare Center Crane, email: Cran_CTO@navy.mil.

FIELD OF THE DISCLOSURE

The present disclosure generally relates to an apparatus and method for automatically controlling and/or monitoring various devices being tested in a laboratory environment.

BACKGROUND

Current methods of controlling transmitters, e.g. prototype, system under test, or experimental transmitters, in lab testing consist of an operator manually activating a control button, which provides a transmitter a required input to begin a transmission sequence. An operator would then observe a standard multi-meter output and record, by hand, a date/time a receive event occurred. This method of testing is both wasteful and inaccurate. A need presently exists for a way to automate and monitor a transmission sequence and receiver event. Another aspect is providing a monitoring and automation system which is flexible enough and capable of monitoring a variety of transmission sequence and/or receiver events to include particular types of timing or signal events.

SUMMARY OF THE DISCLOSURE

In one embodiment of the present disclosure a mini automation controller is provided comprising: a first controller adapted to convert a plurality of first signals to a plurality of second signals, wherein said first signals are defined by a first communication protocol and said second signals are defined by a second communication protocol; a microcontroller operable to automate and monitor at least one event of a group of events comprising a transmission sequence event and a receiver event, said microcontroller being electronically coupled to the first controller; a receiver monitor section adapted to couple with the microcontroller and at least one receiver comprising a monostable multivibrator integrated circuit coupled between the first controller and at least one interface to said at least one receiver; and a transmitter control section adapted to couple with the microcontroller and at least one transmitter, said transmitter control section comprising a transmitter control pulse section and a transmitter power output section, said transmitter control pulse section and transmitter power output section are coupled to said at least one transmitter; wherein the microcontroller can receive a transmitter or receiver event control signal from a control system external to the mini automation controller via the first controller and activates the transmitter control section to send a transmission signal from the transmitter control pulse section and power output section, the microcontroller is configured to receive a receiver activation signal from the monostable multivibrator integrated circuit that the receiver monitor section has received the transmission signal; wherein the microcontroller sends the plurality of first signals to the first controller regarding a status of the transmitter control section and the receiver monitor section wherein the plurality of first signals are converted to the plurality of second signals by the first controller and at least one of the plurality of second signals is sent to the control system external to the mini automation controller.

In another embodiment of the present disclosure a transmission and receive event control system is provided comprising: at least one receiver; at least one transmitter; a test control system comprising a display, a non-transitory storage medium adapted to store a plurality of non-transitory machine readable instructions, an input/output system, and a plurality of test control system machine readable instructions stored on said non-transitory machine readable media including instructions operable to generate one or more graphical user interface on said display adapted to facilitate user control of said transmission and receive event control system, wherein said one or more graphical user interfaces comprises a menu of a plurality of operations associated with one or more transmission sequence events and receiver events; a mini automation controller comprising: a first controller adapted to convert a plurality of first signals to a plurality of second signals, wherein said first signals are defined by a first communication protocol and said second signals are defined by a second communication protocol; a microcontroller operable to automate and monitor at least one event of a group of events comprising said transmission sequence events and receiver events, said microcontroller being electronically coupled to the first controller; a receiver monitor section adapted to couple with the microcontroller and at least one receiver comprising a monostable multivibrator integrated circuit coupled between the first controller and at least one interface to said at least one receiver; a transmitter control section adapted to couple with the microcontroller and at least one transmitter, said transmitter control section comprising a transmitter control pulse section and a transmitter power output section, said transmitter control pulse section and transmitter power output section are coupled to said at least one transmitter; wherein the microcontroller can receive a transmitter or receiver event control signal from said control system external to the mini automation controller via the first controller and activates the transmitter control section to send a transmission signal from the transmitter control pulse section and power output section, the microcontroller is configured to receive a receiver activation signal from the monostable multivibrator integrated circuit that the receiver monitor section has received the transmission signal; and wherein the microcontroller sends the plurality of first signals to the first controller regarding a status of the transmitter control section and the receiver monitor section wherein the plurality of first signals are converted to the plurality of second signals by the first controller and at least one of the plurality of second signals is sent to the control system external to the mini automation controller.

In yet another embodiment of the present disclosure a method of automating and monitoring one or more transmission event sequences and receiver event sequences is provided comprising: providing at least one receiver; providing at least one transmitter; providing a mini automation controller; providing a test control system comprising a display, an input/output system, a plurality of test control system machine readable instructions stored on a non-transitory machine readable media including instructions operable to generate one or more graphical user interfaces on said display adapted to facilitate user control of said transmission and receive event sequences, said one or more graphical user interfaces comprise a first graphical user interface including a first user input box that allows a user to input a desired transmission interval, a second user input box that allows the user to input a desired transmission length, and a third user input box operable to allow the user to set a network address associated with said mini automation controller, wherein said first graphical user interface includes a graphical representation of transmit and receive data associated with the operation of elements of said one or more transmission event sequences and receiver event sequences.

The embodiment further includes said mini automation controller comprising: a network interface controller coupled to said test control system adapted to convert a plurality of first signals to a plurality of second signals, wherein said first signals are defined by a first communication protocol and said second signals are defined by a second communication protocol; a microcontroller comprising a non-transitory memory and a plurality of machine readable instructions stored in said non-transitory memory, said machine readable instructions are operable to automate and monitor at least one event of a group of events comprising said one or more transmission event sequences and said one or more receiver event sequences, said microcontroller being electronically coupled to the network interface controller; a receiver monitor section adapted to couple with the microcontroller and at least one receiver comprising a monostable multivibrator integrated circuit coupled between the network interface controller and said at least one interface to said at least one receiver.

The embodiment further includes a transmitter control section adapted to couple with the microcontroller and said at least one transmitter, said transmitter control section comprising a transmitter control pulse section and a transmitter power output section, said transmitter control pulse section and transmitter power output section are coupled to said at least one transmitter; wherein the microcontroller can receive a transmitter or receiver event control signal from said test control system via the network interface controller and transmitter event control signal activates the transmitter control section to send a transmission signal from the transmitter control pulse section and power output section, wherein the microcontroller is configured to receive a receiver activation signal from the monostable multivibrator integrated circuit that the receiver monitor section has received the transmission signal, where said control system is external to the mini automation controller and comprises a test control system adapted to receive user inputs; wherein the microcontroller sends the plurality of first signals to the network interface controller regarding a status of the transmitter control section and the receiver monitor section wherein the plurality of first signals are converted to the plurality of second signals by the network interface controller and sent to the control system external to the mini automation controller.

The embodiment further includes providing said at least one transmitter and said at least one receiver and coupling said at least one transmitter and said at least one receiver respectively to said transmitter control section and said receive monitor section; setting one or more microcontroller settings, said microcontroller settings comprising one or more user modifiable configuration settings, assigning functions to the microcontroller pins including transmission event and receive event related functions associated respectively with said at least one transmitter and said at least one receiver, setting one or more communications parameters associated with the network interface controller, and setting one or more default settings for timing of at least one of said transmission sequence event, wherein said one or more user modifiable configuration settings comprise timing of said transmission sequence event; monitoring for a first message from said test control system using said microcontroller, wherein a first command is received through said network interface controller; operating at least one of said one or more graphical user interfaces to generate said first message to said mini automation controller.

The embodiment further includes performing a look-up of said first message in said non-transitory memory comprising identifying and selecting one or more of said plurality of machine readable instructions associated with said first message, said one or more of said plurality of machine readable instructions associated with said first message comprising a plurality of instructions operable to control said mini automation controller, said at least one receiver, and said at least one transmitter, said one or more of said plurality of machine readable instructions associated with said first message including instructions operable for controlling execution of said one or more transmission event sequences and receiver event sequences in response to said first message comprises changing said configuration settings; and executing said one or more of said plurality of machine readable instructions associated with said first message.

In yet another embodiment of the present disclosure an electronic controller is provided comprising a converter component communicably coupled to a computing device, the converter component configured to receive at least one data signal from the computing device and output a first converted data signal; a controller component communicably coupled to the converter component and configured to receive the first converted data signal and output a control signal; a first circuit configured to receive the control signal and generate a transmitter control pulse directed to a test device; a second circuit configured to receive one or more indicator signals from the test device wherein the indicator signals include at least one of a high state indicating the test device received the transmitter control pulse and a low state indicating the test device did not receive the transmitter control pulse; a signal hold circuit electrically coupled to the second circuit and the controller component the signal hold circuit configured to hold at least one of the one or more indicator signals for a duration and output the held indicator signal; and wherein the controller component includes logic operative to: generate at least one data signal provided to the converter component wherein the data signal indicates the state of the indicator signal; and wherein the converter component operative to provide a second converted data signal directed to the computing device wherein the second converted data signal indicates the state of the indicator signal.

In yet another embodiment of the present disclosure an automated control system is provided comprising a graphical user interface (GUI) operative to display data corresponding to one or more characteristics of the automated control system; an electronic controller having one or more circuits configured to: generate a reoccurring transmitter control pulse configured for receipt by a test device and receive an indicator signal indicating the test device received at least one occurrence of the reoccurring transmitter control pulse; and a computing device communicably coupled to the GUI and communicably coupled to the electronic controller, the computing device configured to provide one or more operational inputs to the electronic controller and to display, via the GUI, at least one of: a signal waveform corresponding to the actual number of transmitter control pulses generated by the electronic controller and a signal waveform corresponding to the actual number of indicator signals received by the electronic controller.

In yet another embodiment of the present disclosure a method in an automated control system is provided comprising: providing, by a graphical user interface (GUI), one or more operational inputs to an electronic controller; sending, by a computing device, a first data signal to a converter component wherein the data signal includes a first data protocol format; converting, by the converter component, the first data signal to a second data signal including a second data protocol format; generating, by the electronic controller, one or more control signals corresponding to at least one of: a transmitter control pulse and a supply voltage of a predetermined voltage value; providing, by the electronic controller, one or more control signals to a test device wherein at least one control signal is a reoccurring transmitter control pulse that causes a transmitter of the test device to transmit a first signal to a receiver of the test device; receiving, by the electronic controller, one or more indicator signals from the receiver of the test device wherein the indicator signals indicate whether the receiver received the first signal; and receiving, by the computing device, one or more data signals corresponding to the number of indicator signals received by the electronic controller and the number of reoccurring transmitter control pulses provided to the test device.

In yet another embodiment of the present disclosure a method of interfacing with a controller of an automated control system is provided comprising: providing a command to the controller from a computing device to verify a connection between the computing device and the controller; providing a command to the controller from a computing device to obtain a first signal transmit interval wherein the controller responds by providing an integer corresponding to the first signal transmit interval; providing a command to the controller from a computing device, the command indicating a desire to provide a second signal transmit interval; providing an integer to the controller from a computing device in response to the controller requesting a user input, wherein the integer indicates the second signal transmit interval; providing a command to the controller from a computing device to obtain a firmware revision number wherein the controller responds by providing the firmware revision number; providing a command to the controller from a computing device to obtain a serial number corresponding to the controller wherein the controller responds by providing the serial number; providing a command to the controller from a computing device to obtain a first transmit signal length wherein the controller responds by providing an integer corresponding to the first transmit signal length; providing a command to the controller from a computing device, the command indicating a desire to provide a second transmit signal length; providing an integer to the controller from a computing device in response to the controller requesting a user input, wherein the integer indicates the second transmit signal length; and providing a command to the controller from a computing device to begin a signal transmit and signal receive sequence wherein the controller responds by providing an integer indicating that: no transmit signal was detected and no receive signal was detected; only a transmit signal was detected; only a receive signal was detected; a transmit signal was detected and a receive signal was detected.

Additional features and advantages of the present invention will become apparent to those skilled in the art upon consideration of the following detailed description of the illustrative embodiment exemplifying the best mode of carrying out the invention as presently perceived.

BRIEF DESCRIPTION OF THE DRAWINGS

The detailed description of the drawings particularly refers to the accompanying figures in which:

FIG. 2A is a first timing diagram illustrating one feature of an exemplary embodiment of the present disclosure;

FIG. 9 is a command structure providing an exemplary method of interfacing with the main control board of the mini-automation controller of FIG. 3.

DETAILED DESCRIPTION OF THE DRAWINGS

The embodiments of the invention described herein are not intended to be exhaustive or to limit the invention to precise forms disclosed. Rather, the embodiments selected for description have been chosen to enable one skilled in the art to practice the invention.

Figure 1:
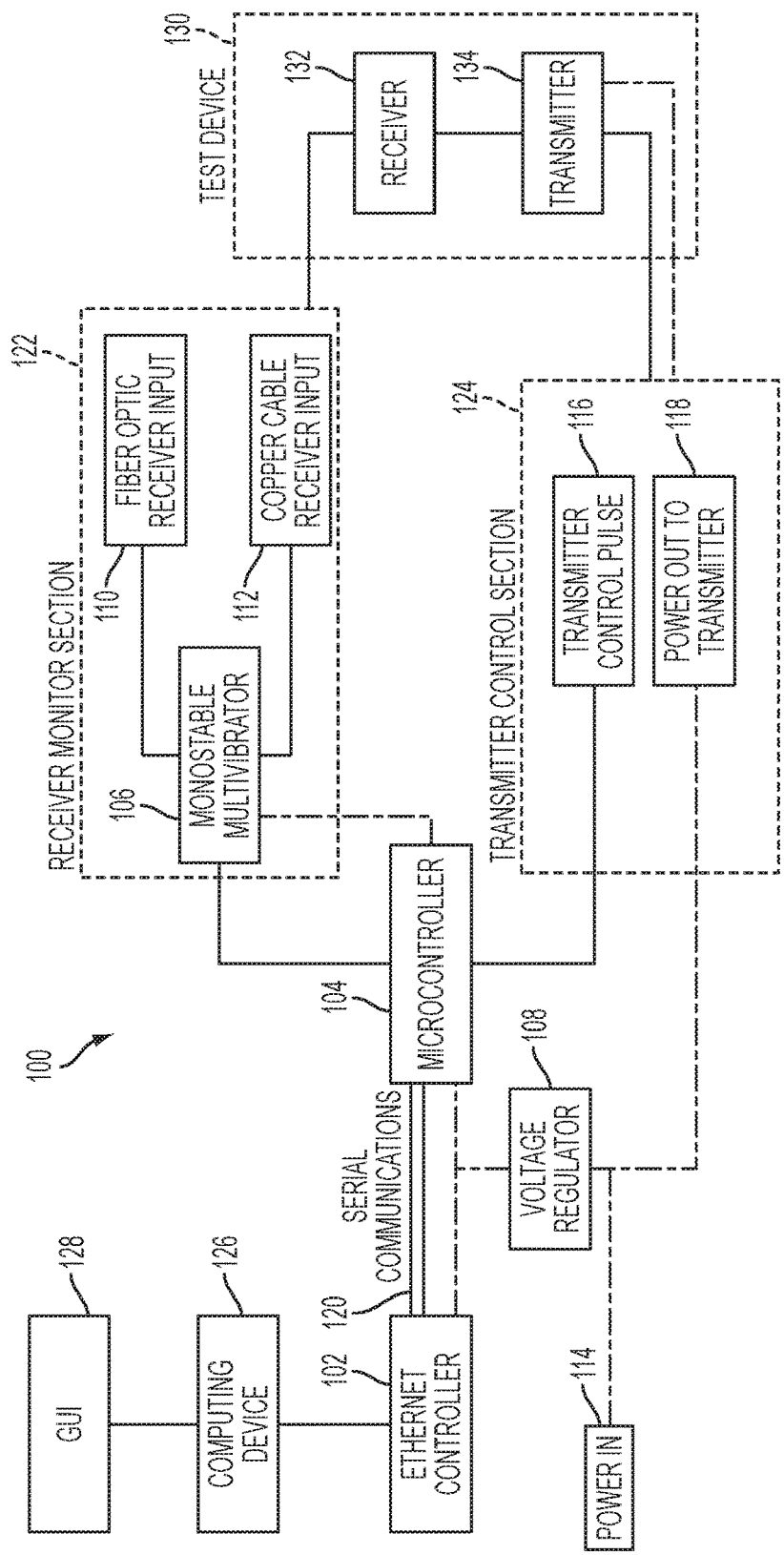
FIG. 1 is a functional block diagram of a mini-automation controller according to the present disclosure.

FIG. 1 shows a functional block diagram of a mini-automation controller 100 (hereinafter "MAC"). MAC 100 includes an Ethernet to Serial converter 102 (hereinafter "Ethernet controller"), a programmable microcontroller 104 (hereinafter "microcontroller"), a voltage regulator 108, a power inlet 114, a receiver monitor section 122, a transmitter control section 124, computing device 126, graphical user interface (GUI) 128, and test device 130, as well as other supporting components. In various embodiments of the present disclosure, MAC 100 may further include one or more printed circuit boards (PCBs) (not shown) wherein a plurality of supporting components such as capacitors, resistors, inductors, switches, light emitting diodes (LEDs), power terminals, and diodes may be soldered or electrically coupled to the one or more PCBs. In an exemplary embodiment, MAC 100 may include a main PCB or control board wherein Ethernet controller 102, microcontroller 104 and voltage regulator 108 may be soldered or electrically coupled to the PCB. Additionally, the main control board may further include one or more of the supporting components described above. The main control board of MAC 100 is described in more detail herein below in the disclosed embodiment of FIG. 8.

Receiver monitor section 122 of MAC 100 includes a monostable multivibrator 106, a fiber optic receiver input 110, and a copper cable receiver input line 112. In the illustrative embodiment of FIG. 1 monostable multivibrator 106 may be electrically coupled to fiber optic receiver input 110 and copper cable receiver input line 112. Monostable multivibrator 106 may be configured to function as a dual retrigger-able precision monostable multivibrator, wherein the dual retrigger functionality includes an active LOW trigger/retrigger and an active HIGH trigger/retrigger. Monostable multivibrator may be further configured to include the capability of prolonging an observed trigger event. Exemplary monostable multivibrators include devices such as Model No. 74HC4538 and 74HCT4538 manufactured by NXP Semiconductors®. According to one embodiment of the present disclosure, fiber optic receiver input 110 may enable MAC 100 to interface with a variety of different devices. In one aspect of this embodiment, the variety of different devices includes, for example, various handheld commercial products such as radios, car alarm systems, and other wireless devices. Additionally, in a variant of this aspect, these devices may be modified for use in a variety of different operational environments including, for example, emergency response, military operations, and laboratory testing environments. According to the present disclosure, fiber optic receiver input 110 may enable MAC 100 to interface with one or more test devices within a laboratory (not shown) wherein the one or more test devices may be initially configured or modified to include fiber optic transmitters. Exemplary fiber optic receivers input include devices such as Model No. HFBR-2414TZ manufactured by Avago Technologies, Inc.® Additionally, and as is known in the art, devices having fiber optic transmitters may interface with other devices having fiber optic input receiving circuitry such as fiber optic receiver input 110 of MAC 100. Such devices may include, but should not be limited to, test device pairs modified to interact with each other such as WIFI or Bluetooth® transmitters and receivers, routers, vehicle based transmitters or receivers, wherein one or more of the test devices may be modified after manufacturing to perform specific functions relative to another device.

As described in further detail herein below, copper cable receiver input 112 provides a power and copper-in connection to MAC 100 via, for example, a circular connector wherein the connector includes a 2-pin configuration. Exemplary circular connectors include connectors such as Model No. PTO2A-8-4S manufactured by Amphenol. In the disclosed embodiment, copper-in connection of copper cable receiver input line 112 provides a direct electrical input signal from, for example, a test device wherein the electrical signal from the test device is received by the main control board of MAC via a copper conductor within the circular connector.

Transmitter control section 124 of MAC 100 includes a transmitter control pulse 116 and a power-out-to-transmitter 118. In the illustrative embodiment of FIG. 1 the main control board of MAC 100 may include one or more supporting components configured to generate a signal corresponding to transmitter control pulse 116 and to generate a signal corresponding to power-out-to-transmitter 118. In one embodiment of the present disclosure, microcontroller 104 may be configured to generate the signal corresponding to transmitter control pulse 116. In one aspect of this embodiment, microcontroller 104 executes one or more instructions wherein execution of the instructions causes the main control board of MAC 100 to transmit the signal corresponding to transmitter control pulse 116 thereby initiating a transmission event. The functionality of microcontroller 104 is described in further detail herein below. In various embodiments of the present disclosure, the signal corresponding to power-out-to-transmitter 118 enables MAC 100 to supply power to a variety of different types of transmitters or test devices, such as test device pairs (e.g. transmitter and receiver device pairs) modified to interact with each other such as WIFI or Bluetooth® transmitters and receivers, routers, vehicle based transmitter or receivers, wherein one or more of the test devices may be modified after manufacturing to perform specific functions relative to another device.

Test device pair 130 of MAC 100 includes a receiver 132 and transmitter 134. In the illustrative embodiment of FIG. 1 transmitter 134 receives transmitter control pulse 116 and power-out-to-transmitter 118. Transmitter 134 is powered by receipt of approximately 12 VDC from power-out-to-transmitter 118 and the trigger event mentioned above occurs when transmitter 134 of test device 130 receives the signal corresponding to transmitter control pulse 116. Power-out-to-transmitter 118 may also be used to supply power to an ancillary component (not shown) which would condition transmitter control pulse 116 to a signal more amenable to transmitter 134. Exemplary ancillary components include electro-mechanical relays configured to translate transmitter control pulse 116 to a switch closure operation thereby providing a signal path to a signal transmit circuit of transmitter 134. Receipt of one or more transmitter control pulses 116 by transmitter 134 causes transmitter 134 to transmit a signal to receiver 132 thereby completing a trigger event. Receiver 132 then generates one or more indicator signals to receiver monitor section 122 of MAC 100.

In one embodiment of the present disclosure, transmitter 134 includes a conventional Radio Frequency (RF) transmitter circuit (not shown) configured to generate an RF signal of a fixed or known frequency via an antenna electrically coupled to the transmitter circuit. As is known in the art, conventional RF transmitter circuits may be designed in a variety of ways and may be found in exemplary devices such as car alarm key fobs, garage door openers and television remote controls. Likewise, in this embodiment, receiver 132 includes a conventional RF signal receiver circuit (not shown) configured to detect an RF signal of a fixed or known frequency via an antenna electrically coupled to the receiver circuit wherein the detected RF signal corresponds to the RF signal generated by the transmit circuit of transmitter 134. Receiver 132 may also be configured to generate an indicator signal in response to detection/receipt of the RF signal generated by the transmit circuit of transmitter 134. Moreover, receiver 132 of test device 130 may be configured to provide the indicator signal to receiver monitor section 122 of MAC 100 via at least one of a fiber optic cable or a copper cable. In various embodiments of the present disclosure, the receiver portion of test device 130 may also include an ancillary component which would condition the indicator signal to a signal more amenable to receiver monitor section 122. Exemplary ancillary components employed within the receiver portion of test device 130 include opto-relays or opto-couplers configured to translate the indicator signal to a switch closure operation thereby providing a signal path to signal receiver monitor section 122. In one embodiment, the switch closure operation includes illuminating a light source within the opto-relay to indicate successful receipt of the RF signal from transmitter 134. The opto-relay may then condition the detected illumination into a signal that can be received by receiver monitor section 122.

As indicated above, monostable multivibrator 106 may be configured to function as a dual retrigger-able precision monostable multivibrator 103. According to the present disclosure, monostable multivibrator 106 serves as a comparator and a re-triggerable monostable signal length extender for signals received from copper cable receiver input line 112 and fiber optic receiver input 110. In one embodiment of the present disclosure, monostable multivibrator 106 receives a signal via a first input pin and provides an output signal having a particular signal output duration. In one aspect of this embodiment, monostable multivibrator 106 may be configured to hold an output signal "high" wherein the high output signal may be a voltage signal that is higher than a "low" signal. Monostable multivibrator 106 may be further configured to hold the output signal high for a predetermined duration of approximately 440 milliseconds (ms). In various embodiments of the present disclosure, microcontroller 104 may be configured to sample, at a predetermined rate, one or more output signals provided by monostable multivibrator 106. In these embodiments, MAC 100 may include a microcontroller that is manufactured or designed to have a signal sampling rate of 10 ms. Configuring monostable multivibrator 106 to hold an output signal high is desirable because, even though microcontroller 104 may be configured to sample output signals provided by monostable multivibrator 106 multiple times within a 10 ms window/interval, microcontroller 104 may use sampling intervals which are not evenly distributed within the 10 ms interval. For example, microcontroller 104 may be manufactured to have a 10 ms sampling period wherein actual signal sampling occurs for approximately 7.8 ms and the remainder of the time (2.2 ms) is reserved for communications between microcontroller 104 and a device host or component upstream such as computing device 126. The 2.2 ms gap in signal sampling by microcontroller 104 could potentially result in microcontroller 104 not receiving one or more signals corresponding to one or more test device 130 trigger events received by at least one of fiber optic receiver input 110 and copper cable receiver input 112. Thus, the output signal hold function of monostable multivibrator 106 allows microcontroller 104 to detect receiver trigger events that fall within, for example, the 2.2 ms non-sampling time or receiver trigger events that are short enough to fall between the selected or programmed signal sampling windows.

As described above, MAC 100 includes microcontroller 104 electrically coupled to the main control board. Exemplary microcontrollers include devices such as Model No. PIC12F1822 manufactured by Microchip. Microcontroller 104 includes at least one processor (not shown) and memory (not shown) wherein the at least one processor is operative to execute programmed instructions stored in memory (i.e. firmware). In the illustrative embodiment of FIG. 1, microcontroller 104 may be electrically and communicably coupled to Ethernet controller 102 and monostable multivibrator 106, wherein microcontroller 104 is disposed generally intermediate Ethernet controller 102 and monostable multivibrator 106. Microcontroller 104 is configured or programmed to receive one or more serial communication input signals from Ethernet controller 102, and the serial input signals cause microcontroller 104 to execute one or more instructions stored in memory. Stated another way, microcontroller 104 may be programmed to receive and/or read one or more serial data input signals from Ethernet controller 102 and when a valid instruction is received microcontroller 104 will perform the required action corresponding to the received instruction. As described above, microcontroller 104 may be further programmed to sample or receive one or more output signals provided by monostable multivibrator 106 and to send one or more output signals wherein at least one output signal corresponds to transmitter control pulse 116. Microcontroller 104 may be further programmed to send one or more serial data output signals to Ethernet controller 104 wherein the serial output signals include data parameters that may ultimately be received by, for example, computing device 126 wherein computing device 126 is operative to display data via GUI 128 that corresponds to the serial data output signals provided by microcontroller 104.

Referring again to the illustrative embodiment of FIG. 1, MAC 100 includes Ethernet controller 102 electrically coupled to the main control board. Exemplary Ethernet controllers include devices such as Model No. SBL2e100IR manufactured by NetBurner, Inc.®. Ethernet controller 102 may be configured or designed to provide Ethernet connectivity to MAC 100 as well as convert incoming Ethernet protocol format data communication signals into a serial protocol format data stream 120. Serial data stream 120 may include one or more general purpose signals that are received and/or read by microcontroller 104 to cause microcontroller 104 to execute one more instructions stored in memory. Microcontroller 104 reads serial data stream 120 from Ethernet controller 102, and when a valid instruction is received, microcontroller 104 performs a required action. Microcontroller 104 may then provide one or more output serial data signals to Ethernet controller 102, and Ethernet controller 102 may then transmit the received data to an external device such as a personal computer or any other device capable of processing the Ethernet signal. In the illustrative embodiment of FIG. 1 Ethernet controller 102 transmits the received data computing device 126 wherein the data is displayed via GUI 128.

In various embodiments of the present disclosure, Ethernet controller 102 is electrically and/or communicably coupled to microcontroller 104 and at least one computing device 126. Computing device 126 includes standard desktop personal or laptop computers having one or more display screens operative to display data accessible by computing device 126 and display data, via GUI 128, provided by Ethernet controller 102. In one embodiment, MAC 100 and computing device 126 are communicably coupled to a local area network via a wireless or wired connection. Ethernet controller 102 allows a user to access and engage in data communications with MAC100 via at least computing device 126 within the local area network. As described in further detail herein below, and as is known in the art, computing device 126 may include one or more software applications having a graphical user interface (GUI) 128. GUI 128 enables the user to locate MAC 100 within the local area network and further enables the user to have overall control of the instructions and commands provided to and executed by the various devices within MAC 100.

Figure 2B:
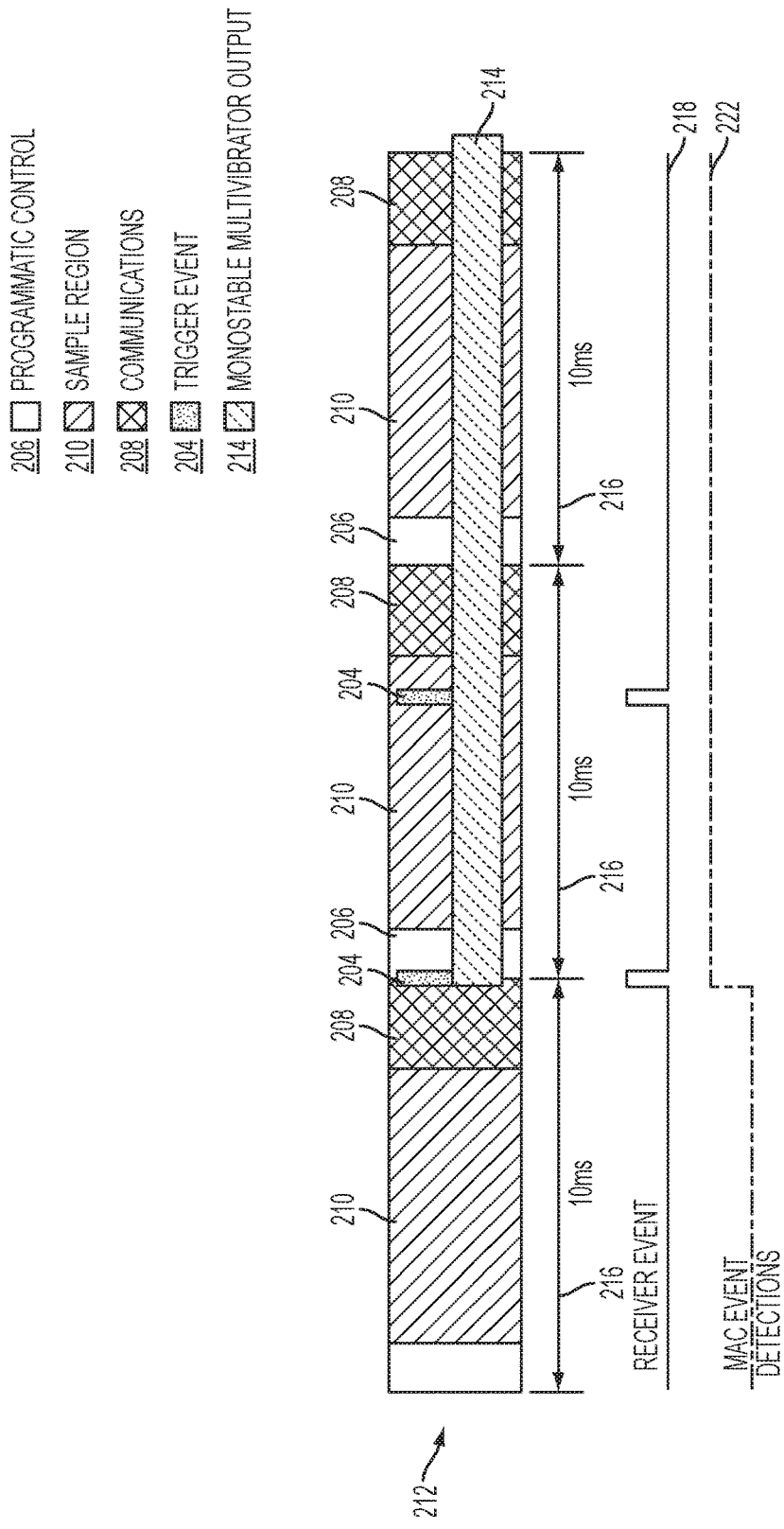
FIG. 2B is a second timing diagram illustrating another feature of an exemplary embodiment of the present disclosure.

The illustrative embodiments of FIGS. 2A and 2B show graphical representations of the sampling functionality of microcontroller 104 described above. FIG. 2A provides a functional diagram depicting direct receiver event sampling which does not include monostable multivibrator 106 providing the signal hold functionality wherein a signal corresponding to at least one of copper receiver input 112 and fiber optic receiver input 110 is held "HIGH" for a certain duration. FIG. 2A includes direct sampling period 202 which includes event 204, programmatic control phase 206, communications phase 208, detection phase 210, signal sampling rate 216, receiver event signal 218, and event detection signal 220. In the disclosed embodiment of FIG. 2A, direct sampling period 202 may initially include programmatic control phase 206, followed by detection phase 210 and concluded by communications phase 208. In one embodiment, the time required for completing the three phases is indicated by signal sampling rate 216 (10 ms).

During detection phase 210 microcontroller 104 may be engaged in actual signal sampling for a duration of approximately 7.8 ms. With regard to the remaining two phases (communication 206 and programmatic control 208) microcontroller 104 may perform functions other than actual signal sampling for a duration of approximately 2.2 ms. Thus, as indicated by FIG. 2A, during direct sampling period 202, a capture event 204 may occur, for example, during communications phase 208 or during programmatic control phase 206 instead of during detection phase 210. If event 204 occurs during a phase other than detection phase 210, then microcontroller 104 may not detect the event 204 when MAC 100 uses direct sampling method 202. Receiver event signal 218 represents an exemplary signal waveform corresponding to a signal which may be received by receiver monitor section 122 prior to being provided as an input to monostable multivibrator 106. Additionally, event detection signal 220 represents an exemplary waveform corresponding to a signal which may be actually received or detected by microcontroller 104 of MAC 100. The illustrative embodiment of FIG. 2A shows that receiver event signal 218 may include at least two signal pulses indicating that receiver monitor section 122 has received a trigger event/ indicator signal from test device 130. This indicator signal also indicates that a trigger event has occurred within test device 130 thereby indicating that test device 130 received at least one transmitter control pulse 116 provided by transmitter control section 116 of MAC 100. As discussed above, the illustrative embodiment of FIG. 2A shows that the first pulse of receiver event signal 218 (also represented by event 204) may occur when during a phase other than detection phase 210. However, the second pulse of receiver event signal 218 may occur during detection phase 210 when microcontroller 104 may be engaged in actual signal sampling. Thus, without the signal hold functionality disclosed in the illustrative embodiment of FIG. 2B, microcontroller 104 of MAC 100 may not detect certain trigger events which occur during communication phase 206 and programmatic control phase 208.

FIG. 2B includes a functional diagram depicting direct receiver event sampling that includes monostable multivibrator 106 providing the aforementioned signal hold functionality. FIG. 2B includes substantially the same features shown in the functional diagram of FIG. 2A except that FIG. 2B includes event detection hold signal 222 and modified sampling period 212 which includes output high signal 214. In various embodiments of the present disclosure, direct sampling period 202 and modified sampling period 212 generally correspond to functions performed or carried out at least in part by microcontroller 104 of MAC 100. As described above, the output signal hold function of monostable multivibrator 106 allows microcontroller 104 to detect receiver trigger events that fall within, for example, the 2.2 ms time period in which microcontroller 104 may not be sampling the one or more receiver input signals (i.e. non-sampling period). FIGS. 2A and 2B therefore provide a depiction of the differences between directly sampling the receiver inputs and using monostable multivibrator 106 to capture a receive event 204. As shown in the illustrative embodiment of FIG. 2B, using the functionality of monostable multivibrator 106, an occurrence of the same event 204 indicated in FIG. 2A causes monostable multivibrator 106 to hold its output signal high for multiple 10 ms periods throughout modified sampling period 214. Thus, holding the output signal high for an extended duration ensures that an output signal corresponding to an event remains high during detection phase 210 of microcontroller 104 and that no event 204 will be missed because the event occurred in a phase other than detection phase 210. Thus, with the signal hold functionality disclosed in the illustrative embodiment of FIG. 2B, event detection signal 222 is held "HIGH" for a certain duration so that microcontroller 104 of MAC 100 may detect trigger events which occur during communication phase 206 and programmatic control phase 208.

Figure 3:
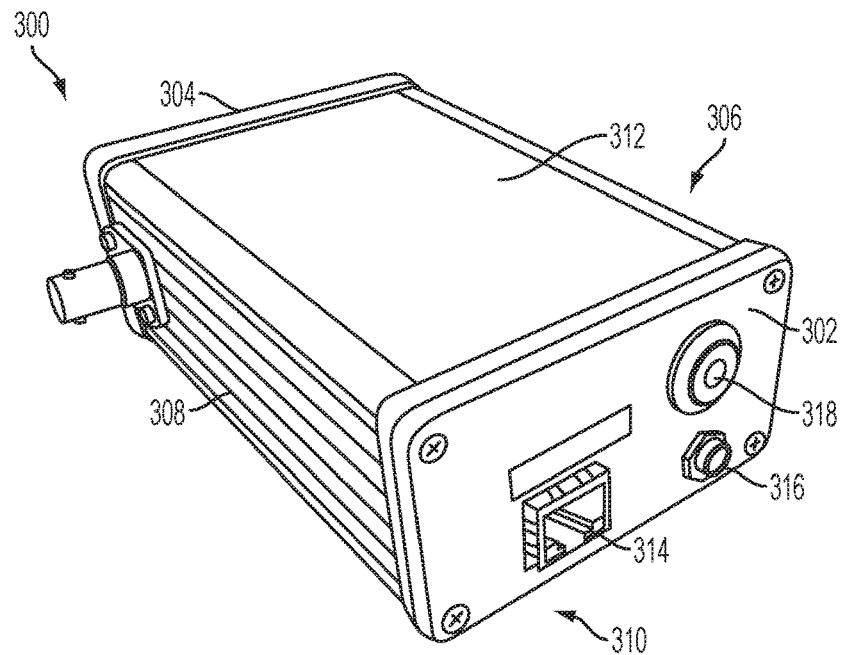
FIG. 3 is a front side perspective view of a mini-automation controller in accordance with an exemplary embodiment of the present disclosure.

FIG. 3 shows a front side perspective view depicting housing 300 in an illustrative embodiment of MAC 100. Housing 300 includes a first side 302, a second side 304, a third side 306, a fourth side 308, a fifth side 310, and a sixth side 312. Sides 302, 304, 306, 308, 310, and 312 of housing 300 substantially enclose at least the main control board and some of the electrical components of MAC 100 which may be coupled to the main control board. First side 302 includes an Ethernet connector 314, a power plug input 316, and a switch with a light-emitting diode (LED) 318. In the illustrative embodiment of FIG. 3 Ethernet connector 314 is configured to receive a standard Ethernet cable having a first end connector and a second end connector wherein the first end connector may be inserted into Ethernet connector 314 and the second end connector may be inserted into or received by, for example, a connector input port of a standard wired or wireless router device. In an alternative embodiment of the present disclosure, the second end of the Ethernet cable may be connected directly to, for example, the computing device 126 described above in connection with the disclosed embodiment of FIG. 1. Power plug input 316 is a standard power input that enables MAC 100 to receive the required voltage and current needed to power the electronic components that are electrically coupled to the main control board. LED switch 318 is a standard push button power switch which may be configured to cause MAC 100 to receive power via power plug input 316. In the disclosed embodiment of FIG. 3, LED switch 318 is generally configured to enable MAC 100 to receive power when LED switch 318 is in a closed state and to not receive power when LED switch 318 is in an open state.

Figure 4:
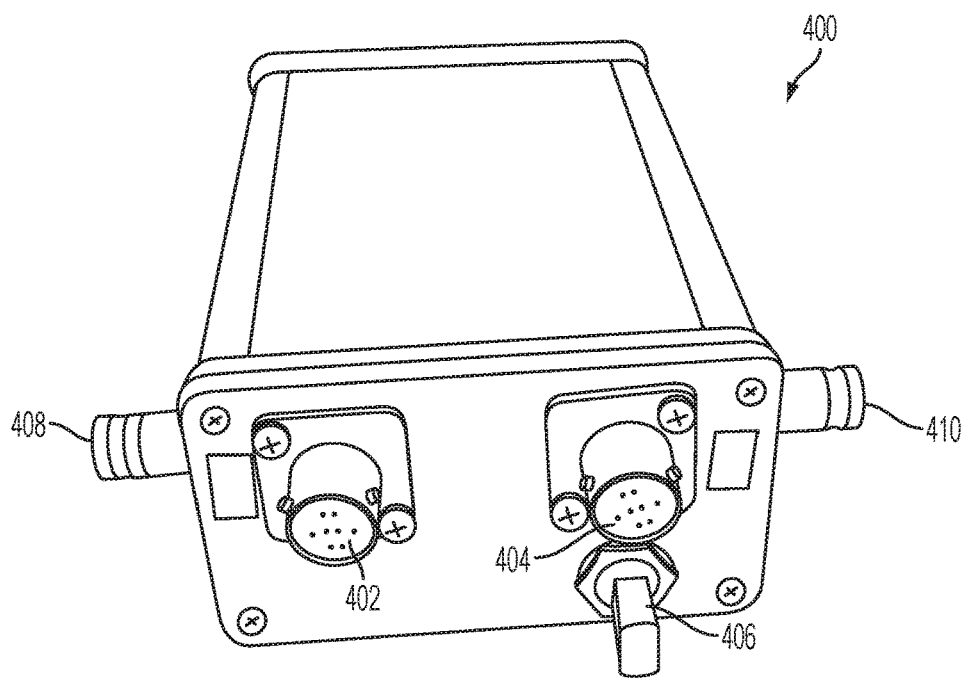
FIG. 4 is a back side perspective view of the mini-automation controller of FIG. 3.

FIG. 4 shows a backside perspective view depicting housing 300 in an illustrative embodiment of the MAC 100. Second side 304 of housing 300 includes a transmitter connector 402 and a receiver connector 404. Exemplary transmitter and receiver connectors include circular connector Model No. PT02A-8-4S manufactured by Amphenol. In the illustrative embodiment of FIG. 4, second side 304 may also include a fiber optic receiver input 406. Third side 306 of the housing 300 may include a first BNC port 408 and fourth side 308 of housing 300 may include a second BNC port 410. According to one embodiment of the present disclosure, first BNC port 408 may be configured to function as an external trigger output, wherein the trigger output signal may be synchronized to transmitter control pulse 116 within transmitter control section 124 of MAC 100. Additionally, first BNC port 408 may be used for triggering external capture equipment such as an oscilloscope or spectrum analyzer (not shown). In various embodiments of the present disclosure, the external capture equipment may provide, for example, a voltage or current waveform indicating certain technical characteristics of transmitter control pulse 116. Second BNC port 410 may be connected to or share an input connection with at least copper cable receiver input line 112 of receiver monitor section 122. Thus, second BNC port 410 may be used as a test port to verify the functionality of MAC receiver monitor section 122 by, for example, monitoring the indicator signal received in response to transmitter control pulse 116 being provided to transmitter 134 of test device 130.

Table 1 illustrated below outlines exemplary connections between transmitter connector 402 and receiver connector 404 for each of the connectors' respective exemplary functions. According to the present disclosure, in addition to transmitter connector 402 and receiver connector 404, first BNC port 408 and second BNC port 410 may also be connected to transmitter control section 124 and receiver monitor section 122 respectively. Additionally, an outer shell of each of first BNC port 408 and second BNC port 410 may be connected to a common ground (not shown) within MAC 100. In one embodiment of the present disclosure, the center conductor of first BNC port 408 (Pin D) may be connected to or share a connection with a device trigger signal connection such as transmitter control plus 116 within MAC 100. In one aspect of this embodiment, the center conductor of second BNC port 410 (Pin B) may be connected to or share a connection with the signal path corresponding to copper cable receiver input line 112 within the main control board of MAC 100.

TABLE 1

| First BNC Port 408 | | | Second BNC Port 410 | | |
| --- | --- | --- | --- | --- | --- |
| PT02A-8-4S | Cable | Function | PT02A-8-4S | Cable | Function |
| A | White | Device Return Signal | A | Blue | Power |
| B | Red | Power Out | B | Blue | Copper |
| C | Black | Ground | C | | |
| D | Green | Device Trigger | D | | |

Table 1

Figure 5:
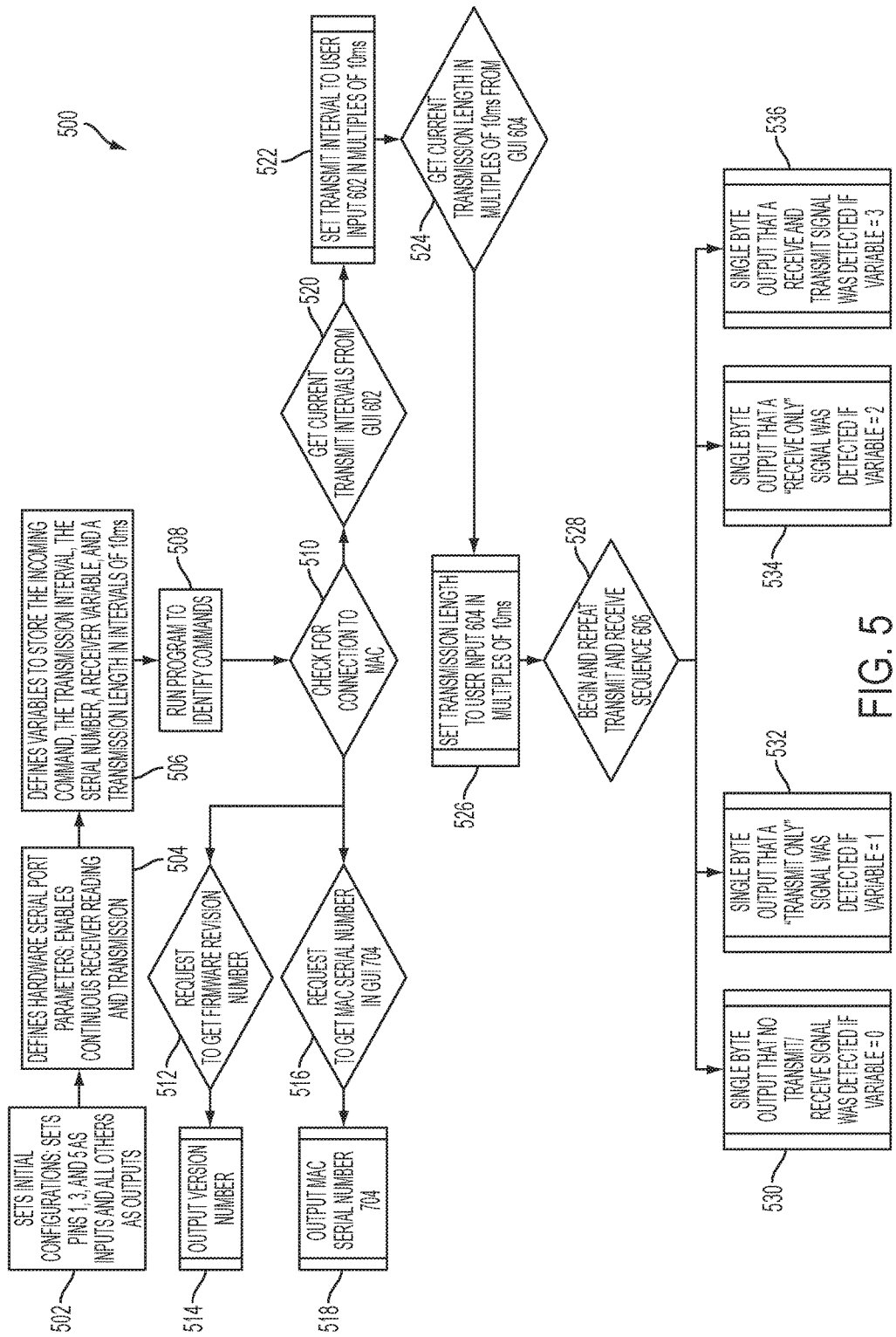
FIG. 5 is a flow diagram providing an illustrative method of operation of the mini-automation controller of FIG. 3.
Figure 6:
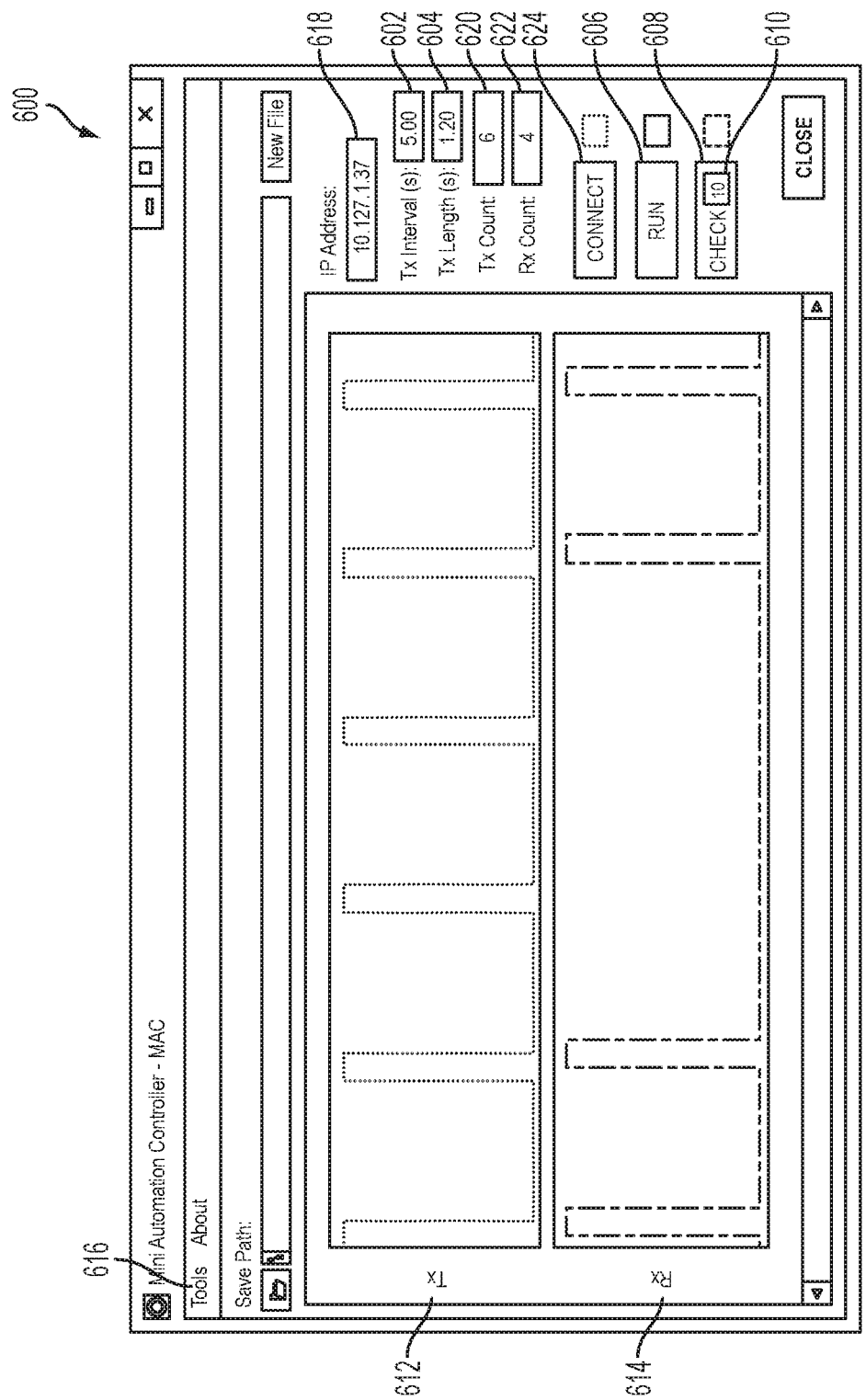
FIG. 6 is an illustration of a first graphical user interface window that can be used to control the mini-automation controller of FIG. 3.
Figure 7:
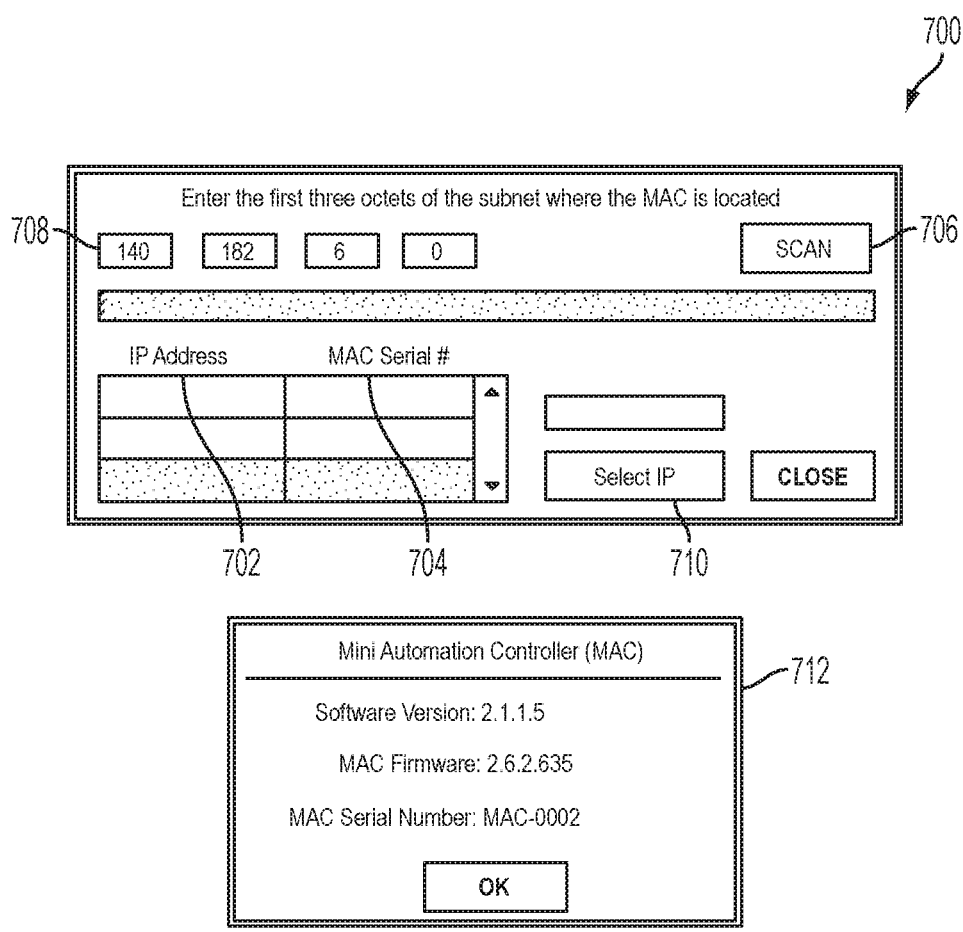
FIG. 7 is an illustration of a second and third graphical user interface window that can be used to control the mini-automation controller of FIG. 3.

FIG. 5 is a flow diagram of an illustrative method of operation of MAC 100. As indicated above, computing device 126 may include one or more software applications having GUI 128. As is described in further detail herein below, the disclosed embodiment of FIG. 6 and FIG. 7 illustrate actual exemplary GUI windows according to the present disclosure, namely hereinafter GUI 600 and GUI 700. GUI 600 enables the user to locate MAC 100 within the local area network and further enables the user to have overall control of the instructions and commands provided to and executed by the various devices within MAC 100. The disclosed embodiment of method 500 includes a plurality of steps for operating MAC 100 that enables communication between, for example, the firmware of microcontroller 104 and the software application (GUI) of the controlling computer or computing device 126. At block 502 the method includes configuring the input and output general purpose (GP) pins of microcontroller 104 wherein GP pins 1, 3 and 5 may be configured as inputs for receiving input signals and all remaining pins may be configured either as outputs for sending output signals or as pins which are connected to ground.

At block 504 the method may define one or more hardware serial port parameters to enable microcontroller 104 to perform continuous reading of one or more signals provided by, for example, receiver monitor section 122 and transmitter control section 124. At block 506, a user may set one or more default variables, via GUI 600, that may be used to execute communications with a software application accessible by computing device 126. Default variables include, for example, transmission interval wherein the interval is defined by the number of signals corresponding to transmitter control pulse 116 that is provided by microcontroller 104 and transmission length is the length of the signal which may be generally characterized in one or more 10 ms durations. At block 508 microcontroller 104 may begin data communications with the software application accessible by computing device 126. The software application, GUI 600, and GUI 700 are discussed in further detail herein below in the disclosed embodiment of FIG. 6 and FIG. 7.

In one embodiment of the present disclosure, a user at computing device 126 my run the software application to provide, via at least Ethernet controller 102, one or more user commands to microcontroller 104. At block 510, an initial communication between the software application and microcontroller 104 may be to determine overall connectivity between MAC 100 and the controlling computer device 126. Once a connection between MAC 100 and computer device 126 is established, microcontroller 104 may be configured to then search for or wait to receive a command or query from the software application. Thus, at block 512, a query command from computing device 126 may be provided to microcontroller 104 wherein the query request causes microcontroller 104 to provide, for example, the revision number of the firmware stored in the memory of microcontroller 104. Accordingly, at block 514 if the revision number is accessible from the memory, then microcontroller 104 may output the corresponding firmware revision number. However, if no firmware revision number query is provided by the software application, or alternatively, after the firmware revision number is provided, the method proceeds to block 516 and microcontroller 104 may search for or wait to receive a subsequent command or query from the software application. At block 516 the subsequent command or query may include a request by the software application for microcontroller 104 to provide the serial number assigned to MAC 100. As disclosed in greater detail in the disclosed embodiment of FIG. 7, GUI 700 may include a scan/query function in which, upon entering the appropriate subnet, a user may perform a network scan to obtain the internet protocol (IP) address and corresponding serial number for at least one MAC 100 connected to a particular network subnet. After initiating the network scan the method proceeds to block 518, wherein the scan function causes the software application to send a signal, via Ethernet controller 102, to MAC 100 which thereby causes microcontroller 104 to send an output signal to the software application corresponding to the MAC serial number previously established during configuration of the one or more default variables. The software application may be further configured to display, via GUI 700, the serial number corresponding to MAC 100.

According to the present disclosure, after connectivity between MAC 100 and computer device 126 is established, the method proceeds to block 520 and microcontroller 104 may seek to establish or receive the desired transmit intervals from the software application. In one embodiment of the present disclosure the desired transmit intervals may correspond to the default intervals entered by the user at block 506. In an alternative embodiment, a user may enter a desired transmit interval which differs from the default transmit interval. As described in further detail herein below, GUI 600 may include a user input box 602 that allows the user to input the desired transmission interval. Once the user establishes the desired transmission interval, the software application provides a signal to MAC 100 corresponding to the desired interval. Thus, at block 522, upon receiving the signal indicating the desired transmit interval, microcontroller 104 may set the transmit interval variable within the firmware equal to the interval entered by the user via user input box 602. In addition to receiving the desired transmission interval, at block 524, microcontroller 104 may also seek to establish the desired transmission length from the software application. More specifically, at block 526, GUI 600 may include a user input box that allows a user to enter or set a desired transmission length 604 wherein the transmission length may be provided as one or more 10 ms durations. Accordingly, at block 526, once the user inputs a value indicating a desired transmission length, microcontroller 104 may set the transmission length variable within the firmware equal to the length entered by the user via user input box 604.

Referring again to the illustrative embodiment of FIG. 5, at block 528 microcontroller 104 may receive a signal from the software application indicating that the user desires to initiate a test to verify the dual functions of the software application and MAC 100. In one embodiment, the signal to initiate the test may be provided to microcontroller 104, for example, via the software application when the user selects "RUN" button 606 or selects "CHECK" button 608 via GUI 600. In one aspect of this embodiment, selection of the "RUN" button by the user may initiate continuous transmission events whereas selection of the "CHECK" button may initiate one or more transmission events depending on the desired number of events inputted by the user. Once a test or event is initiated at block 528, microcontroller 104 and MAC 100 will send a signal, via transmitter control section 124, corresponding to transmitter control pulse 116 and monitors receiver monitor section 122 and transmitter control section 124 to determine whether an actual test or detection event occurred within test device 130.

As provided in the illustrative embodiment of FIG. 5, MAC 100 and the software application may be configured such that a test or detection event may yield a predetermined number of outcomes. The predetermined outcomes may include the following: 1) no transmit or receive signal was detected (block 530); 2) a transmit only signal was detected (block 532); 3) a receive only signal was detected (block 534); 4) a transmit and receive signal was detected (block 536). Accordingly, in one embodiment of the present disclosure, microcontroller 104 may be configured to receive one or more signals indicating the resulting outcome of the initiated test or detection event. Moreover, microcontroller 104 may be further configured to send the software application the results, for example, in the form of a single byte of data. Thus, at block 530, if there is no transmit or receive signal observed or detected by MAC 100, then microcontroller 104 may send a signal to the software application indicating a single byte of data representing the binary equivalent of a "0". In one aspect of this embodiment, if there is a transmit signal observed or detected by MAC 100, microcontroller 104 may send a signal to the software application indicating a byte of data representing the binary equivalent of a "1". Likewise, in a variant of this aspect, if there is a receive signal observed or detected by MAC 100, microcontroller 104 may send a signal to the software application indicating a byte of data representing the binary equivalent of a "2". Lastly, in another variant of this aspect, if there is both a transmit signal and a receive signal observed or detected by MAC 100, microcontroller 104 may send a signal to the software application indicating a byte of data representing the binary equivalent of a "3".

In various embodiments of the present disclosure, the steps or processes involved in the above referenced method 500 should not be limited to the sequence described in the present disclosure. One of ordinary skill in the art could readily understand the plurality of different options for organizing or executing the steps of method 500 in order to achieve substantially the same results or outcomes disclosed above. For example, a user may command microcontroller 104 to set the desired transmit interval either before or after commanding microcontroller 104 to set the desired transmission length or commanding microcontroller 104 to provide the serial number of MAC 100. Accordingly, the present disclosure contemplates that one of ordinary skill in the art may implement or execute one or more steps of method 500 in a plurality of different ways. Thus, the present disclosure should not be limited to the particular order disclosed above in connection with the illustrative embodiment of FIG. 5.

FIG. 6 and FIG. 7 provide illustrative embodiments of GUI 600 and GUI 700. In various embodiments of the present disclosure, computing device 126 may include GUI 600 and 700 wherein both GUIs enable a user to provide one or more data parameters to MAC 100 and view data corresponding to one or more data parameters or signals associated with MAC 100. For example, GUI 600 allows a user to perform a plurality of functions which cause the above referenced software application to send one or more instructions/commands to microcontroller 104 of MAC 100. GUI 600 and 700 may be designed by, for example, utilizing third party software programs to produce custom built software applications, such as the software application referenced above in connection with the disclosed embodiment of FIG. 5. Exemplary third party software applications include programs, such as MATLAB, LabVIEW, and Windows Telnet Application.

According to the present disclosure, GUI 600 includes a transmit interval input 602, a transmission length input 604, a "RUN" button 606, a "CHECK" button 608, a check input 610, a first graph section 612, a second graph section 614, a menu 616, an IP address display 618, a transmission signal count 620, a receive signal count 622, and a "CONNECT" button 624. As indicated above in connection with the illustrative embodiment of FIG. 5, transmit interval input 602 allows a user to input a data parameter indicating a desired transmit interval. The transmit interval corresponds to the number of transmitter control pulses 116 that are provided by MAC 100 to test device 130. Likewise, transmission length input 604 allows a user to input a data parameter indicating a desired transmission length. The transmission length corresponds to the duration or length of a single transmitter control pulse 116. "RUN" button 606 allows the user to initiate a continuous test or detection event wherein a plurality of transmitter control pulses 116 are provided to test device 130 until the user stops the test by once again selecting "RUN" button 606. "CHECK" button 608 allows the user to initiate one or more a transmitter control pulse 116 events depending on the desired number of events inputted by the user. Accordingly, check input 610 allows the user to input the desired number of events. For example, if the user enters 10 into check input 610 and then selects "CHECK" button 608 then MAC 100 will respond by sending 10 transmitter control pulses 116 to test device 130 and stop after the tenth pulse is sent.

GUI 600 further includes at least two graph sections that allow separation of data received from receiver monitor section 122 and from transmitter control section 124. More particularly, GUI 600 can graphically display data in first graph section 612 wherein the data corresponds to signals detected by transmitter control section 124. Likewise, GUI 600 can graphically display data in second graph section 614 wherein the data corresponds to signals detected by receiver monitor section 122. Moreover, in the illustrative embodiment of FIG. 6, first graph section 612 may indicate the state of microcontroller 104 pin "7" and may be labeled "Tx." Similarly, second graph section 614 may indicate the state of the microcontroller 104 pin "6" and may be labeled "Rx". Transmission signal count 620 indicates the number of transmitter control pulses 116 detected by transmitter control section 124. Likewise, receive signal count 622 indicates the number of indicator signals received by, for example, receiver monitor section 122 via fiber optic receiver input line 110 and copper cable input line 112.

According to the present disclosure, when a transmission signal or a receive signal is detected by MAC 100, microcontroller 104 sends a signal to the software application and the application displays the data to the user by providing a numerical output. The software application may increment the numerical output in real time in response to MAC 100 detecting additional transmission signals or additional receive signals. "CONNECT" button 624 allows the user to initiate a connection between the software application and MAC 100 by, for example, entering an IP address assigned to MAC 100. To properly identify the correct internet protocol (IP) address 618 of MAC 100, the software application may include a scan utility option within dropdown menu 616. In response to selecting the scan utility option the software application will launch GUI 700 wherein the user will be allowed to initiate a scan of, for example, the wired or wireless network to find the desired MAC 100 that they desire to use.

The illustrative embodiment of FIG. 7 shows GUI 700 which includes the scan utility. GUI 700 may include a display section operative to display at least one IP address 702 corresponding to MAC 100 and display at least one serial number 704 corresponding to MAC 100. If there are multiple MACs 100 on a given network, then the user may select the serial number 704 and IP address of the MAC 100 that they desire to use. GUI 700 further includes "SCAN" button 706, subnet input 708, "Select IP" button 710, and MAC info display 712. "SCAN" button 706 allows the user to initiate a scan of, for example, the wired or wireless network to find the desired MAC 100 that they want to use. Prior to initiating a scan, the user may, via subnet input 708, enter the appropriate network subnet in which the desired MAC 100 may be located. After initiating the scan "Select IP" button 710 allows the user to select a desired IP address 702 and corresponding MAC serial number 704 for a desired MAC 100.

Figure 8:
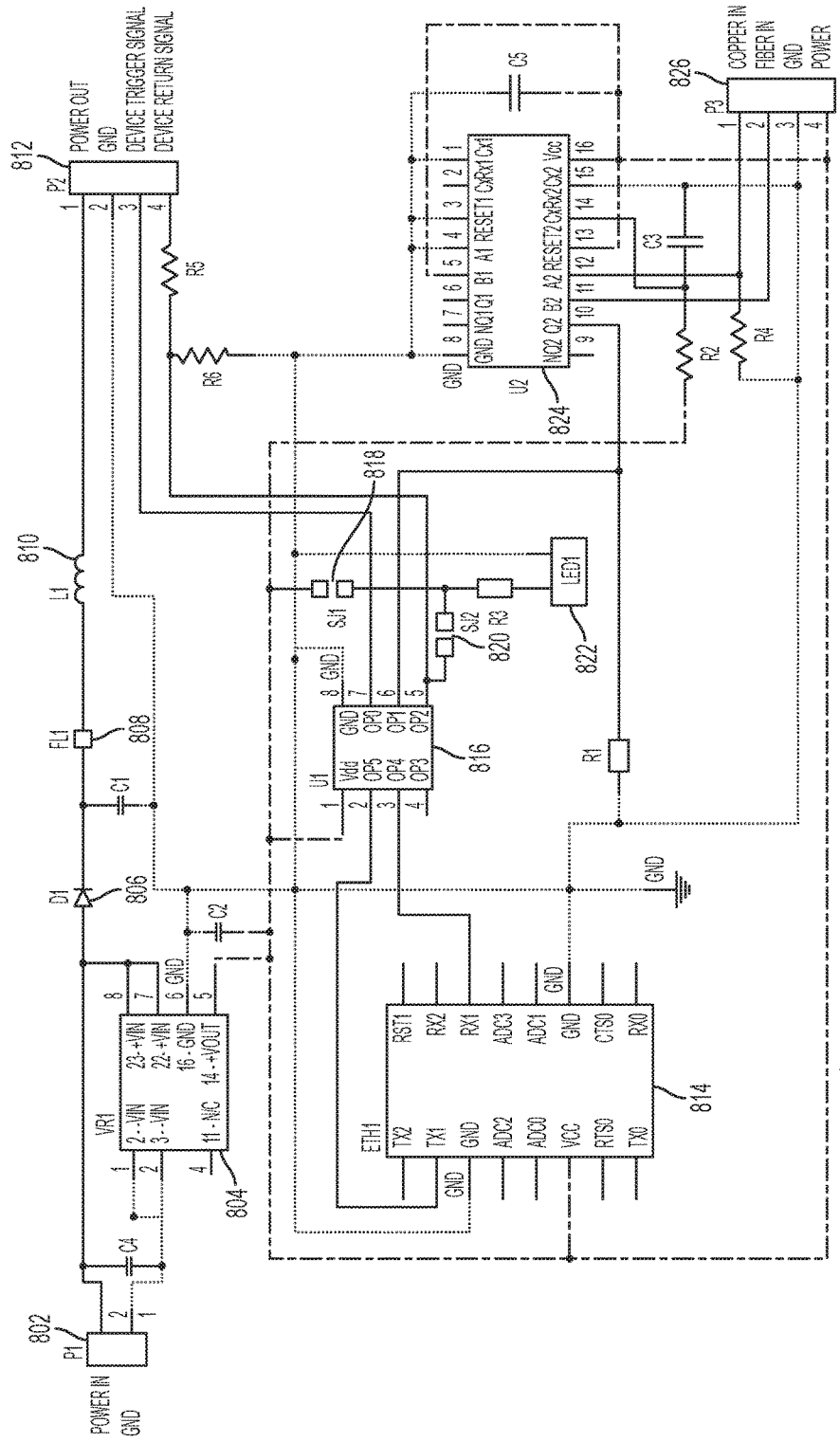
FIG. 8 is an illustration of an exemplary circuit schematic of the main control board of the mini-automation controller of FIG. 3.

The illustrative embodiment of FIG. 8 shows an exemplary circuit schematic of the main control board of MAC 100. Circuit 800 generally includes power input terminal 802, voltage regulator 804, diode 806, filter 808, inductor 810 and power output terminal 812. Circuit 800 further generally includes Ethernet controller 814, microcontroller 816, first solder jumper 818, second solder jumper 820, LED 822, monostable multivibrator 824, signal input terminal 826. As described above, in various embodiments of the present disclosure, MAC 100 may include a printed circuit board (PCB) (not shown) wherein a plurality of components such as capacitors, resistors, inductors, switches, light emitting diodes (LEDs), power terminals, and diodes may be soldered or electrically coupled thereto. As is known in the art, circuit designs such as circuit 800 provide the schematic that one of ordinary skill in the art may use to produce a printed circuit board having the plurality of components described above.

According to the present disclosure, circuit 800 receives the required supply voltage via power input terminal 802. In one embodiment of the present disclosure, circuit 800 receives a supply voltage of 12.6 VDC. Voltage regulator 804 functions as step-down regulator that receives, as an input, the 12.6 VDC and provides a stepped-down output voltage of approximately 3.3 VDC. Diode 806 provides voltage and current flow in one direction, generally from the anode to the cathode and blocks, for example, current flow in the reverse direction or from the cathode to the anode. Filter 808 and inductor 810 provide noise suppression on the 12.6V supply line by, for example, suppressing unwanted voltage or current spikes. Power output terminal 812 provide a point of connection to the 12.6 VDC supply voltage in order to power the test device 130. Power output terminal 812 also provides a point of connection between the main control board and test device 130. Thus, power output terminal 812 enables the signal corresponding to transmitter control pulse 116 (device trigger signal) to be received by test device 130 such that test device 130 may initiate a transmission event in response to receiving transmitter control pulse 116.

As described above, Ethernet controller 814 converts incoming Ethernet based data communication signals into a serial data stream that is received by microcontroller 816. In the illustrative embodiment of FIG. 8, Ethernet controller 814 includes a plurality of signal pins and "Tx1" may be configured to send an outgoing serial data stream to pin 2 of microcontroller 816 whereas "Rx1" may be configured to receive an incoming serial data stream from pin 3 of microcontroller 816. Microcontroller 816 also includes a plurality of other signal pins. In one embodiment of the present disclosure, microcontroller 816 includes six signal pins wherein pins 1, 2, 5 and 6 are signal input pins while the remaining pins are either output pins, power pins or are connected to ground. Microcontroller 816 may be configured to receive, via pin 2, a serial data stream from Ethernet controller 814 and may be configured to send, via pin 3, a serial data stream to Ethernet controller 814. Microcontroller 816 may also send, via pin 7, a signal corresponding to transmitter control pulse 116 (Device Trigger Signal) to test device 130. Microcontroller 816 may also receive, via pin 5, a return signal from the device under test indicating that the signal corresponding to transmitter control pulse 116 was in fact received by the test device. Moreover, as indicated above, microcontroller 816 samples, at a predetermined rate, one or more signals output by or received from monostable multivibrator 824. Thus, microcontroller 816 may sample and/or receive, via pin 6, an output signal corresponding to, for example, receiver detection signal (indicator signal) that is provided as an input to monostable multivibrator 824 via at least one of copper cable receiver input 112 and fiber optic receiver input 110. Signal input terminal 826 provides points of connection which enable MAC 100 to receive the input signals provided by copper cable receiver input 112 and fiber optic receiver input 110.

Monostable multivibrator 824 also includes a plurality of signal pins wherein pins 11, 12 and 16 are single input pins, pin 10 is a signal output pin, and the remaining pins generally may be tied to ground. Monostable multivibrator 824 may be configured to receive, via pins 11 and 12, a signal corresponding to at least one of fiber optic receiver input 110 and copper cable receiver input 112, respectively. As indicated above, monostable multivibrator 824 may be further configured to hold the fiber optic or copper cable input signal "HIGH" and output, via pin 10, the "HIGH" output signal that is subsequently sampled/received by microcontroller 816. In one embodiment of the present disclosure, first solder jumper 818 allows LED 822 to receive power via the stepped-down 3.3 VDC provided by voltage regulator 804. In an alternative embodiment, second solder jumper 820 allows LED 822 to receive power via microcontroller 816. Thus, LED 822 may be configured as a light indicator that indicates when MAC 100 has received the appropriate supply voltage or as a light indicator that indicates, via microcontroller 816, that command functions within microcontroller 816 have properly initialized and that the firmware is functioning as programmed.

In one embodiment of the present disclosure, MAC 100 operates as follows: pin 7 of microcontroller 816 may be connected to test device 130 and used to trigger the transmission of a signal that is provided to transmitter 134 via transmitter control section 124. Likewise pin 6 may be connected to the output of monostable multivibrator 824 and microcontroller 816 may sample indicator signals received by receiver monitor section 122. With regard to the pins of microcontroller 816, when an event occurs, event detection may be in the form of a change in voltage at input pin 6 in response to receiver 132 of test device 130 transmitting a signal that is received by receiver monitor section 122. In one aspect of this embodiment, a voltage of less than approximately 0.8 volts direct current (VDC) may be interpreted by microcontroller 816 as "low" state or "0" and a voltage greater than approximately 2 VDC may be interpreted as a "high" state or "1".

To send the status of transmitter control section 124 and receiver monitor section 122 expediently and accurately, the state of microcontroller 816 pin 6 may be bit shifted one place to the left and a bitwise "OR" operation may be performed with microcontroller 104 pin 7. For example, if microcontroller 816 pin 6 is a "1" (HIGH signal) and microcontroller 816 pin 7 is a "0" (LOW signal) the following byte pattern may be transmitted to Ethernet controller 814 via microcontroller 816: "00000001" (8 bit representation of decimal 1) may be bit shifted to the left by one place and the result is "00000010". This result may then be cross checked with the binary representation of the microcontroller pin 6, in this case "00000000". The result of this operation is "00000010" in binary or the decimal equivalent of the number "2". As a result, the state of both microcontroller 816 pins 7 and 6 may be sent to Ethernet controller 814 using a single byte of data. This method of transmitting the signal state of the pin 6 and pin 7 may result in one of four possible numbers being provided to Ethernet controller 814. The four possible states include: 0, 1, 2 and 3, wherein each state may be indicated by one byte of data. In various embodiments of the present disclosure, the four states correspond to the four predetermined outcomes discussed above in connection with the illustrative embodiment of FIG. 5. Moreover, in addition to the single data byte being sent by microcontroller 816, two additional bytes (a carriage return and line feed) may be added to the data byte provided to ethernet controller 814, wherein the additional bytes indicate to the host computer or controller computing device 126 that the data sending process initiated by microcontroller 816 has completed.

The illustrative embodiment of FIG. 9 shows a command structure providing an exemplary method of interfacing with the main control board of MAC 100. Command structure 900 includes a plurality of command blocks showing exemplary command descriptions, exemplary commands, and exemplary expected responses. The command descriptions generally correspond to one or more functions performed or inputted by a user residing at, for example, computing device 126. The commands indicate the actual command language/text inputted by the user to interface with the main control board of MAC 100 and the expected response indicates the actual response from the main control board once the main control board receives a command from the user. As indicated above in the disclosed embodiment of FIG. 6, GUI 600 allow users to perform a plurality of functions which cause a software application installed on computing device 126 to send one or more instructions/commands to the main control board (MCB) of MAC 100. Command structure 900 may be used by one of ordinary skill to interface with the MCB of MAC 100 via exemplary software applications such as Matlab, LabVIEW, or Windows Telnet. According to the present disclosure, the illustrative embodiment of FIG. 9 includes command block 902 which includes command "100\r". In one embodiment of the present disclosure, a user may interface with the MCB of MAC 100 via Windows Telnet by first entering the IP address for MAC100 to initially locate and attempt to connect to MAC 100 within a wireless or wired local area network. The user may then input/send the command "100\r" to the MCB of MAC 100 via the Windows Telnet application wherein microcontroller 104 coupled to the MCB includes firmware that causes microcontroller 104 to output an expected response of "OK" thereby verifying a connection between computing device 126 and the MCB of MAC100.

In another embodiment of the present disclosure, a user may interface with the MCB of MAC 100 via a software application such as LabVIEW. GUI 600 and GUI 700 provide illustrations of an exemplary user interface that may be developed by one of ordinary skill using the commercially available LabVIEW software application. As depicted in GUI 600, LabVIEW enables one of ordinary skill to select a button/icon from the LabVIEW icon database and label the icon as "CONNECT" wherein one of ordinary skill may further program the "CONNECT" button 624 to send command "100\r" to the microcontroller 104 when a user clicks "CONNECT" button 624. Likewise, when microcontroller 104 outputs the "OK" in response to receiving the command "100\r", one of ordinary skill may program the green indicator within GUI 600 to illuminate in response to receiving the "OK" from the firmware of microcontroller 104.

The above description with regard to command block 902 and command "100\r" is applicable to the remaining command blocks and corresponding commands of MAC command structure 900. Command block 904 includes command "101\r" which enables one of ordinary skill to interface with the MCB by using the software application installed on computing device 126 to send command "101\r" to cause microcontroller 104 to respond by providing the current transmit interval in multiples of 10 ms. The current transmit interval indicates the current or most recently saved transmit interval residing in, for example, a memory module of microcontroller 104. Command block 904 further includes the expected response wherein microcontroller 104 will respond with an integer from 10 to 65535 to indicate the current transmit interval. Command block 906 includes command "102\r" which enables one of ordinary skill to interface with the MCB by using the software application installed on computing device 126 to send command "102\r" to the MCB indicating that the user wishes to set a new a transmit interval in multiples of 10 ms. Microcontroller 104 may then respond by instructing the user to input the new transmit interval wherein the input provided by the user is limited to an integer value ranging from 10 to 65535. In one embodiment of the present disclosure and as indicated by GUI 600, one of ordinary skill may program the software application to run the command "102\r" in a continuous loop wherein the user may simply input a desired transmit interval via, for example, user input box 602 and microcontroller 104 will recognize the input and set a new transmit interval. Thus, because the software application is programmed to run command "102\r" in a continuous loop any subsequent integer inputs provided to user input box 602 will cause the microcontroller 104 to set a new transmit interval.

Command block 908 includes command "103\r" which enables one of ordinary skill to interface with the MCB by using the software application installed on computing device 126 to send command "103\r" to the MCB to cause microcontroller 104 to respond by providing the firmware version/revision number. Command block 908 further includes the expected response wherein microcontroller 104 will respond with the firmware revision in an exemplary format such as "Version: X.X.X.1822". An exemplary implementation of a software application programmed to implement command "103\r" is provided by MAC info display 712 of GUI 700. Command block 910 includes command "104\r" which enables one of ordinary skill to interface with the MCB by using the software application installed on computing device 126 to send command "104\r" to the MCB to cause microcontroller 104 to respond by providing the MAC serial. Command block 910 further includes the expected response wherein microcontroller 104 will respond with the MAC serial number in an exemplary format such as "S/N: MAC-XXXX\r\n" wherein X is an integer value ranging from 0 to 255. As noted above with regard to command "103\r", MAC info display 712 of GUI 700 also provides an exemplary implementation of a software application programmed to implement command "104\r".

Command block 912 includes command "105\r" which enables one of ordinary skill to interface with the MCB by using the software application installed on computing device 126 to send command "105\r" to the MCB to cause microcontroller 104 to respond by providing the current transmit length in multiples of 10 ms. Command block 912 further includes the expected response wherein microcontroller 104 will respond with an integer from 2 to 65535 to indicate the current transmit length. Command block 914 includes command "106\r" which enables one of ordinary skill to interface with the MCB by using the software application installed on computing device 126 to send command "106\r" to the MCB indicating that the user wishes to set a new transmit length in multiples of 10 ms. Microcontroller 104 may then respond by instructing the user to input the new transmit length wherein the input provided by the user is limited to an integer value ranging from 2 to 65535. In one embodiment of the present disclosure and as indicated by GUI 600, one of ordinary skill may program the software application to run the command "106\r" in an event driven mode wherein the user may simply input a desired transmit length via, for example, user input box 604 and microcontroller 104 will recognize the input and set a new transmit length. Thus, because the software application is programmed to run command "106\r" in the event that the value in box 604 changes, any subsequent integer inputs provided to user input box 604 will cause the microcontroller 104 to set a new transmit length.

Command block 916 includes command "1\r" which enables one of ordinary skill to interface with the MCB by using the software application installed on computing device 126 to send command "1\r" to the MCB to cause MAC100 to begin the signal transmit and signal receive sequence. Command block 916 further includes the expected response wherein microcontroller 104 will respond with an integer from 0 to 3 wherein: 0 indicates no transmit signal detected and no receive signal detected; 1 indicates transmit signal only detected; 2 indicates receive signal only detected; and 3 indicates both transmit signal detected and receive signal detected. In one embodiment of the present disclosure and as indicated by GUI 600, one of ordinary skill may program a software application such as LabVIEW to include a first graph section 612 that provides a signal wave form indicating when a transmit signal is detected. Likewise, the software application may further include a second graph section 614 that provides a signal wave form indicating when a receive signal is detected. In another embodiment of the present disclosure, a user may simply input/send the command "1\r" to the MCB of MAC 100 via the Windows Telnet Application. The firmware installed in microcontroller 104 will thereby cause microcontroller 104 to output an expected response of "N" wherein "N" is a "0", "1", "2", or "3" viewable to the user via the Windows Telnet Application display.

In the foregoing specification, specific embodiments of the present disclosure have been described. However, one of ordinary skill in the art will appreciate that various modifications and changes can be made without departing from the scope of the disclosure as set forth in the claims below. Accordingly, the specification and figures are to be regarded in an illustrative rather than a restrictive sense, and all such modifications are intended to be included within the scope of disclosure. The benefits, advantages, solutions to problems, and any element(s) that may cause any benefit, advantage, or solution to occur or become more pronounced are not to be construed as critical, required, or essential features or elements of any or all the claims. The disclosure is defined solely by the appended claims including any amendments made during the pendency of this application and all equivalents of those claims as issued. Although the invention has been described in detail with reference to certain preferred embodiments, variations and modifications exist within the spirit and scope of the invention as described and defined in the following claims.

The invention claimed is:

1. A mini automation controller, comprising:
   a first controller adapted to convert a plurality of first signals to a plurality of second signals, wherein said first signals are defined by a first communication protocol and said second signals are defined by a second communication protocol;

a microcontroller operable to automate and monitor at least one event of a group of events comprising a transmission sequence event and a receiver event, said microcontroller being electronically coupled to the first controller;

a receiver monitor section adapted to couple with the microcontroller and at least one receiver comprising a monostable multivibrator integrated circuit coupled between the first controller and at least one interface to said at least one receiver; and a transmitter control section adapted to couple with the microcontroller and at least one transmitter, said transmitter control section comprising a transmitter control pulse section and a transmitter power output section, said transmitter control pulse section and transmitter power output section are coupled to said at least one transmitter;

wherein the microcontroller can receive a transmitter or receiver event control signal from a control system external to the mini automation controller via the first controller and activates the transmitter control section to send a transmission signal from the transmitter control pulse section and power output section, the microcontroller is configured to receive a receiver activation signal from the monostable multivibrator integrated circuit that the receiver monitor section has received the transmission signal;

wherein the microcontroller sends the plurality of first signals to the first controller regarding a status of the transmitter control section and the receiver monitor section wherein the plurality of first signals are converted to the plurality of second signals by the first controller and at least one of the plurality of second signals is sent to the control system external to the mini automation controller.

2. The mini automation controller of claim 1, wherein said first communication protocol includes an Ethernet protocol format.

3. The mini automation controller of claim 1, wherein said second communication protocol includes a serial interface protocol format.

4. The mini automation controller of claim 1, wherein said receiver monitor section comprises a fiber optic receiver inlet and a copper wire receiver inlet, and said fiber optic receiver inlet and said copper wire receiver inlet are adapted to couple said monostable multivibrator integrated circuit with said at least one receiver.

5. The mini automation controller of claim 4, wherein said transmission signal is sent to said at least one receiver from said monostable multivibrator integrated circuit through either said fiber optic receiver inlet or the copper wire receiver inlet.

6. A transmission and receive event control system, comprising:

at least one receiver;

at least one transmitter;

a test control system comprising a display, a non-transitory storage medium adapted to store a plurality of non-transitory machine readable instructions, an input/output system, and a plurality of test control system machine readable instructions stored on said non-transitory machine readable media including instructions operable to generate one or more graphical user interface on said display adapted to facilitate user control of said transmission and receive event control system, wherein said one or more graphical user interfaces comprises a menu of a plurality of operations associated with one or more transmission sequence events and receiver events; and a mini automation controller comprising:

a first controller adapted to convert a plurality of first signals to a plurality of second signals, wherein said first signals are defined by a first communication protocol and said second signals are defined by a second communication protocol;

a microcontroller operable to automate and monitor at least one event of a group of events comprising said transmission sequence events and receiver events, said microcontroller being electronically coupled to the first controller;

a receiver monitor section adapted to couple with the microcontroller and at least one receiver comprising a monostable multivibrator integrated circuit coupled between the first controller and at least one interface to said at least one receiver;

a transmitter control section adapted to couple with the microcontroller and at least one transmitter, said transmitter control section comprising a transmitter control pulse section and a transmitter power output section, said transmitter control pulse section and transmitter power output section are coupled to said at least one transmitter;

wherein the microcontroller can receive a transmitter or receiver event control signal from said control system external to the mini automation controller via the first controller and activates the transmitter control section to send a transmission signal from the transmitter control pulse section and power output section, the microcontroller is configured to receive a receiver activation signal from the monostable multivibrator integrated circuit that the receiver monitor section has received the transmission signal; and wherein the microcontroller sends the plurality of first signals to the first controller regarding a status of the transmitter control section and the receiver monitor section wherein the plurality of first signals are converted to the plurality of second signals by the first controller and at least one of the plurality of second signals is sent to the control system external to the mini automation controller.

7. The transmission and receive event control system of claim 6, wherein said first communication protocol includes an Ethernet protocol format.

8. The transmission and receive event control system of claim 6, wherein said second communication protocol includes a serial interface protocol format.

9. The transmission and receive event control system of claim 6, wherein said receiver monitor section comprises a fiber optic receiver inlet and a copper wire receiver inlet, wherein said fiber optic receiver inlet and said copper wire receiver inlet are adapted to couple said monostable multivibrator integrated circuit with said at least one receiver.

10. The transmission and receive event control system of claim 9, wherein said transmission signal is sent to said at least one receiver from said monostable multivibrator integrated circuit through either said fiber optic receiver inlet or the copper wire receiver inlet.

11. A method of automating and monitoring one or more transmission event sequences and receiver event sequences comprising:

providing at least one receiver;

providing at least one transmitter;
providing a mini automation controller;
providing a test control system comprising a display, an input/output system, a plurality of test control system machine readable instructions stored on a non-transitory machine readable media including instructions operable to generate one or more graphical user interfaces on said display adapted to facilitate user control of said transmission and receive event sequences, said one or more graphical user interfaces comprise a first graphical user interface including a first user input box that allows a user to input a desired transmission interval, a second user input box that allows the user to input a desired transmission length, and a third user input box operable to allow the user to set a network address associated with said mini automation controller, wherein said first graphical user interface includes a graphical representation of transmit and receive data associated with the operation of elements of said one or more transmission event sequences and receiver event sequences;
said mini automation controller comprising:
  a network interface controller coupled to said test control system adapted to convert a plurality of first signals to a plurality of second signals, wherein said first signals are defined by a first communication protocol and said second signals are defined by a second communication protocol;
  a microcontroller comprising a non-transitory memory and a plurality of machine readable instructions stored in said non-transitory memory, said machine readable instructions are operable to automate and monitor at least one event of a group of events comprising said one or more transmission event sequences and said one or more receiver event sequences, said microcontroller being electronically coupled to the network interface controller;
  a receiver monitor section adapted to couple with the microcontroller and at least one receiver comprising a monostable multivibrator integrated circuit coupled between the network interface controller and said at least one interface to said at least one receiver;
  a transmitter control section adapted to couple with the microcontroller and said at least one transmitter, said transmitter control section comprising a transmitter control pulse section and a transmitter power output section, said transmitter control pulse section and transmitter power output section are coupled to said at least one transmitter;
  wherein the microcontroller can receive a transmitter or receiver event control signal from said test control system via the network interface controller and transmitter event control signal activates the transmitter control section to send a transmission signal from the transmitter control pulse section and power output section, wherein the microcontroller is configured to receive a receiver activation signal from the monostable multivibrator integrated circuit that the receiver monitor section has received the transmission signal, where said control system is external to the mini automation controller and comprises a test control system adapted to receive user inputs;
  wherein the microcontroller sends the plurality of first signals to the network interface controller regarding a status of the transmitter control section and the receiver monitor section wherein the plurality of first signals are converted to the plurality of second signals by the network interface controller and sent to the control system external to the mini automation controller;
providing said at least one transmitter and said at least one receiver and coupling said at least one transmitter and said at least one receiver respectively to said transmitter control section and said receive monitor section;
setting one or more microcontroller settings, said microcontroller settings comprising one or more user modifiable configuration settings, assigning functions to the microcontroller pins including transmission event and receive event related functions associated respectively with said at least one transmitter and said at least one receiver, setting one or more communications parameters associated with the network interface controller, and setting one or more default settings for timing of at least one of said transmission sequence event, wherein said one or more user modifiable configuration settings comprise timing of said transmission sequence event;
monitoring for a first message from said test control system using said microcontroller, wherein a first command is received through said network interface controller;
operating at least one of said one or more graphical user interfaces to generate said first message to said mini automation controller;
performing a look-up of said first message in said non-transitory memory comprising identifying and selecting one or more of said plurality of machine readable instructions associated with said first message, said one or more of said plurality of machine readable instructions associated with said first message comprising a plurality of instructions operable to control said mini automation controller, said at least one receiver, and said at least one transmitter, said one or more of said plurality of machine readable instructions associated with said first message including instructions operable for controlling execution of said one or more transmission event sequences and receiver event sequences in response to said first message comprises changing said configuration settings; and
executing said one or more of said plurality of machine readable instructions associated with said first message.

12. The method of claim 11, wherein said network interface controller includes an Ethernet protocol format.

13. The method of claim 11, wherein said second communication protocol includes a serial interface protocol format.

14. The method of claim 11, wherein said receiver monitor section comprises a fiber optic receiver inlet and a copper wire receiver inlet, wherein said fiber optic receiver inlet and said copper wire receiver inlet are adapted to couple said monostable multivibrator integrated circuit with said at least one receiver.

15. The method of claim 14, wherein said transmission signal is sent to said at least one receiver from said monostable multivibrator integrated circuit through either said fiber optic receiver inlet or the copper wire receiver inlet.

16. The method of claim 14, further comprising at least one of storing and logging results of said step of executing said one or more of said plurality of machine readable instructions associated with said first message.

* * * * *